United States Patent
Nomura et al.

(10) Patent No.: US 10,423,739 B2
(45) Date of Patent: *Sep. 24, 2019

(54) METHODS FOR ORIENTING MATERIAL PHYSICAL PROPERTIES USING CONSTRAINT TRANSFORMATION AND ISOPARAMETRIC SHAPE FUNCTIONS

(71) Applicant: TOYOTA MOTOR ENGINEERING & MANUFACTURING NORTH AMERICA, INC., Erlanger, KY (US)

(72) Inventors: Tsuyoshi Nomura, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 432 days.

This patent is subject to a terminal disclaimer.

(21) Appl. No.: 15/407,366

(22) Filed: Jan. 17, 2017

(65) Prior Publication Data
US 2017/0124233 A1     May 4, 2017

Related U.S. Application Data

(63) Continuation of application No. 13/747,955, filed on Jan. 23, 2013, now Pat. No. 9,576,088.

(51) Int. Cl.
  *G06F 17/50* (2006.01)
  *G06F 17/11* (2006.01)
  *G06F 17/16* (2006.01)

(52) U.S. Cl.
  CPC ......... *G06F 17/5018* (2013.01); *G06F 17/11* (2013.01); *G06F 17/16* (2013.01); *G06F 2217/06* (2013.01); *G06F 2217/44* (2013.01)

(58) Field of Classification Search
None
See application file for complete search history.

(56) References Cited

U.S. PATENT DOCUMENTS 123,507 A    2/1872   Paekhuest
185,003 A   12/1876   Wheeler
(Continued)

OTHER PUBLICATIONS

Nomura et al, "General topology optimization method with continuous and discrete orientation design using isoparametric projection." International Journal for Numerical Methods in Engineering 101, No. 8 (2015): 571-605. (Year: 2015).*

(Continued)

*Primary Examiner* — Omar F Fernandez Rivas
*Assistant Examiner* — Robert S Brock
(74) *Attorney, Agent, or Firm* — Dinsmore & Shohl LLP

(57) ABSTRACT

Constraint-based methods for determining orientations of material physical properties using an isoparametric shape function are disclosed. In one embodiment, a method of defining an orientation of an material physical property includes defining nonlinear and/or discontinuous design constraints of design values in a geometric domain associated with one or more physical attributes of the material physical property, and translating the nonlinear and/or discontinuous design constraints into continuous, first order design constraints of the design values by applying an isoparametric shape function. The method further includes performing a topology optimization using the continuous, first order design constraints of the design values, and reverse-translating results of the topology optimization back into the geometric domain using the isoparametric shape function. The results of the topology optimization in the geometric domain are indicative of the orientation of the material physical property.

17 Claims, 17 Drawing Sheets

(56) References Cited

U.S. PATENT DOCUMENTS

| | | | |
|---|---|---|---|
| 4,754,119 A | 6/1988 | Knauss | |
| 6,618,694 B1 | 9/2003 | Shibuya et al. | |
| 8,271,237 B2 | 9/2012 | Borrvall et al. | |
| 2003/0082315 A1* | 5/2003 | Mehlman | B32B 3/12 428/16 |
| 2007/0075450 A1 | 4/2007 | Belegundu et al. | |
| 2008/0274326 A1* | 11/2008 | Kim | B29C 70/24 428/90 |
| 2008/0275677 A1 | 11/2008 | Landon | |
| 2011/0117309 A1* | 5/2011 | Ma | E04C 2/3405 428/77 |
| 2011/0301920 A1 | 12/2011 | Witowski et al. | |
| 2013/0269159 A1* | 10/2013 | Robitaille | B29B 11/16 28/143 |
| 2016/0052214 A1* | 2/2016 | Gilbert | B29C 70/38 700/33 |

OTHER PUBLICATIONS

Jiang, Delin, Robert Hoglund, and Douglas E. Smith. "Continuous Fiber Angle Topology Optimization for Polymer Composite Deposition Additive Manufacturing Applications." Fibers 7, No. 2 (2019): 14. 21 pages (Year: 2019).*

Svanberg, The method of moving asymptotes a new method for structural optimization, Int. J. Numer. Meth. Engng. 24(2) 1987 (pp. 359-373).

Maute et al., Adaptive topology optimization, Structural Optimization 10, 1995 (pp. 100-112).

Sukumar et al., Recent advances in the construction of polygonal finite element interpolants, Arch. Comput Meth. Engng. 13:1(129-163) 2006.

Choi et al., Simultaneous structure topology optimization of electromagnetic sources and ferromagnetic materials, ScienceDirect, Comput. Methods Appln. Mech. Engrg. 198 (2009) 2111-2121; Elsevier.

Talischi et al., Polygonal finite elements for topology optimization: A unifying paradigm, Int. J. Numer. Meth. Engng. 82, 2010 (pp. 671-698).

Bruyneel, A new parameterization based on shape functions for optimal material selection: application to conventional composite piles, Struct Multidisc Optim, 2011, 43:17-27, Springer-Verlag 2010.

Labbe et al, Adaptive topology optimization of electromagnetic devices: design of a switched reluctance motor, 9th World Congress on Structural and Multidisciplinary Optimization, Jun. 13-17, 2011, Shizuoka, Japan (10 pgs).

Lee et al., Simultaneous design optimization of permanent magnet, coils, and ferromagnetic material in actuators, in Magnetics, IEEE Transactions 47:12 (4712-4716) Dec. 2011.

Sun et al., Design of magnetoelectric multiferroic heterostructures by topology optimization, J. Phys. D: Appl. Phys 44 (2011) 185003 (8 pgs).

Lee et al., Design optimization of magnetic fluid cooling system, Paper No. IMECE2012-85817, pp. 667-672 ASME 2012 International Mechanical Engineering Congress and Exposition, vol. 7: Fluids and Heat Transfer, Parts A, B, C, and D, Houston, Texas (Nov. 9-15, 2012).

Lee et al., Heat flow control in thermo-magnetic convective systems using engineered magnetic fields, Applied Physics Letters, 101, 123507 (Sep. 17, 2012), DOI:http://dx.doi.org/ 10.1063/1.4754119 (5 pgs).

Lee et al., Magnetic force enhancement in a linear actuator by air-gap magnetic field distribution optimization and design, Finite Elements in Analysis and Design 58 (2012), (pp. 44-52).

Talischi et al, PolyTop: a Matlab implementation of a general topology optimization framework using unstructured polygonal finite element meshes, Struct. Multidisc Optim (2012) 45:329-357.

Nomura et al., Simultaneous optimization of topology and orientation of anistropic material using isoparametric projection method, 11th World Congress on Structural and Multidisciplinary Optimization, Jun. 7-12, 2015, Sydney Australia (6 pgs).

Gao et al., A bio-value coding parameterization scheme for the discrete optimal orientation design of the composite laminate.

Dede, Multiphysics topology optimization of heat transfer and fluid flow systems, Excerpt from the Proceedings of the COSMOL Conference, 2009, Boston (7 pgs).

Wikipedia Contributors, Ferrofluid, Wikipedia, the free encyclopedia, Jan. 2, 2012 (8 pgs).

* cited by examiner

METHODS FOR ORIENTING MATERIAL PHYSICAL PROPERTIES USING CONSTRAINT TRANSFORMATION AND ISOPARAMETRIC SHAPE FUNCTIONS

CROSS-REFERENCE TO RELATED APPLICATIONS

The present application is a continuation of U.S. patent Ser. No. 13/747,955, Jan. 23, 2013.

TECHNICAL FIELD

The present specification generally relates to methods for determining orientations of material physical properties and, more particularly, constraint-based methods for determining orientations of material physical properties using an isoparametric shape function.

BACKGROUND

Computer aided engineering analysis, for example, topology optimization techniques such as finite element models (FEM), incorporate computational techniques that are used to find approximate solutions to engineering problems. In general, a model representing the geometry of interest is discretized into a plurality of elements that collectively represent the entire geometry. Because of the elements' reduced size, computers executing the FEM analysis are capable of solving the partial differential equations that govern the physical properties of each of the elements and, therefore, provide an approximate solution to the physical problem for the entire geometry of interest.

Defining in the FEM model the orientation of the material physical property or properties (e.g., magnetic north of a permanent magnet) in polar coordinates (i.e., radius and angle of orientation) imposes a non-continuous design constraint on the material physical property because the angle of orientation is between 0° and 360°. Similarly, limiting the orientation of the material physical property using a Cartesian coordinate system imposes a nonlinear design constraint on the property because the position of the property must satisfy a second-order condition (i.e., $(x^2+y^2)^{1/2}<1$).

Another difficulty in optimizing the orientation of material physical properties includes application of design constraints that are non-continuous. For example, properties may be limited in orientation to a pre-determined number of directions in the physical domain. For example, manufacturing constraints may limit the orientation of the property, such as the direction of magnetic fields of magnets in a magnetic system, into four, six, or eight directions.

Using traditional optimization techniques, the material properties of each of the finite elements would have non-continuous design constraints applied, which increases optimization model complexity and computational time to complete convergence of the optimization model. Further, incorporating such a model with non-continuous design constraints into an optimization routine may be difficult or prohibitive, as the optimization model having non-continuous design constraints may lack the flexibility to make incremental changes to the orientation of the material physical properties of the elements while allowing the optimization model to converge.

Accordingly, a need exists for alternative methods for convergence of nonlinear programming problems that involve angles as material property design variables, and promoting convergence of the material property design variable angles into a set of specified desired angles.

SUMMARY

In one embodiment, a method of defining an orientation of a material physical property includes defining nonlinear and/or discontinuous design constraints of design values in a geometric domain associated with one or more physical attributes of the material physical property, and translating the nonlinear and/or discontinuous design constraints into continuous, first order design constraints of the design values by applying an isoparametric shape function. The method further includes performing a topology optimization using the continuous, first order design constraints of the design values, and reverse-translating results of the topology optimization back into the geometric domain using the isoparametric shape function. The results of the topology optimization in the geometric domain are indicative of the orientation of the material physical property.

In another embodiment, a method of determining an arrangement of a plurality of material physical properties of a device includes providing initial design values $\xi_i$ and $\eta_i$ for each material physical property on a normalized coordinate system, wherein $-1<\xi<1$ and $-1<\eta<1$ for $i=1, 2, \ldots, n$. The method further includes projecting the initial design values $(\xi_i, \eta_i)$ to projected initial design values $(x_i, y_i)$ on a Cartesian coordinate system using an isoparametric shape function $Nx(\xi, \eta)$, $Ny(\xi, \eta)$ having a plurality of nodes such that $x_i=Nx(\xi_i, \eta_i)$, $y_i=Ny(\xi_i, \eta_i)$, and $\sqrt{(x_i^2+y_i^2)}<1$. The method further includes obtaining convergence in an objective function by execution of a topology optimization of $x_i$, $y_i$ and determining an orientation of each material physical property based on final design variables $x_i$, $y_i$ for each material physical property i of the plurality of material physical properties.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the appended figures, embodiments of the present disclosure are directed to nonlinear programming methods for arranging material physical properties of devices or systems. As used here, the phrase "material physical property" means a property of the device or system that is being optimized, such as the arrangement of a magnet and the corresponding direction of its magnetic field. Embodiments ease handling and convergence of nonlinear programming problems with a set of pairs or triplets of design values, which usually represent vector values in Cartesian coordinates involving magnitude and direction. Embodiments also utilize an isoparametric shape function with application of a penalty factor to promote convergence of such directional material physical property design values into a set of specified desired options (e.g., angles of permanent magnets or arrangement of fibers of layers of a composite structure) to avoid unwanted intermediate angles in the final design. Various embodiments of nonlinear programming methods will be described in more detail herein.

Figure 1:
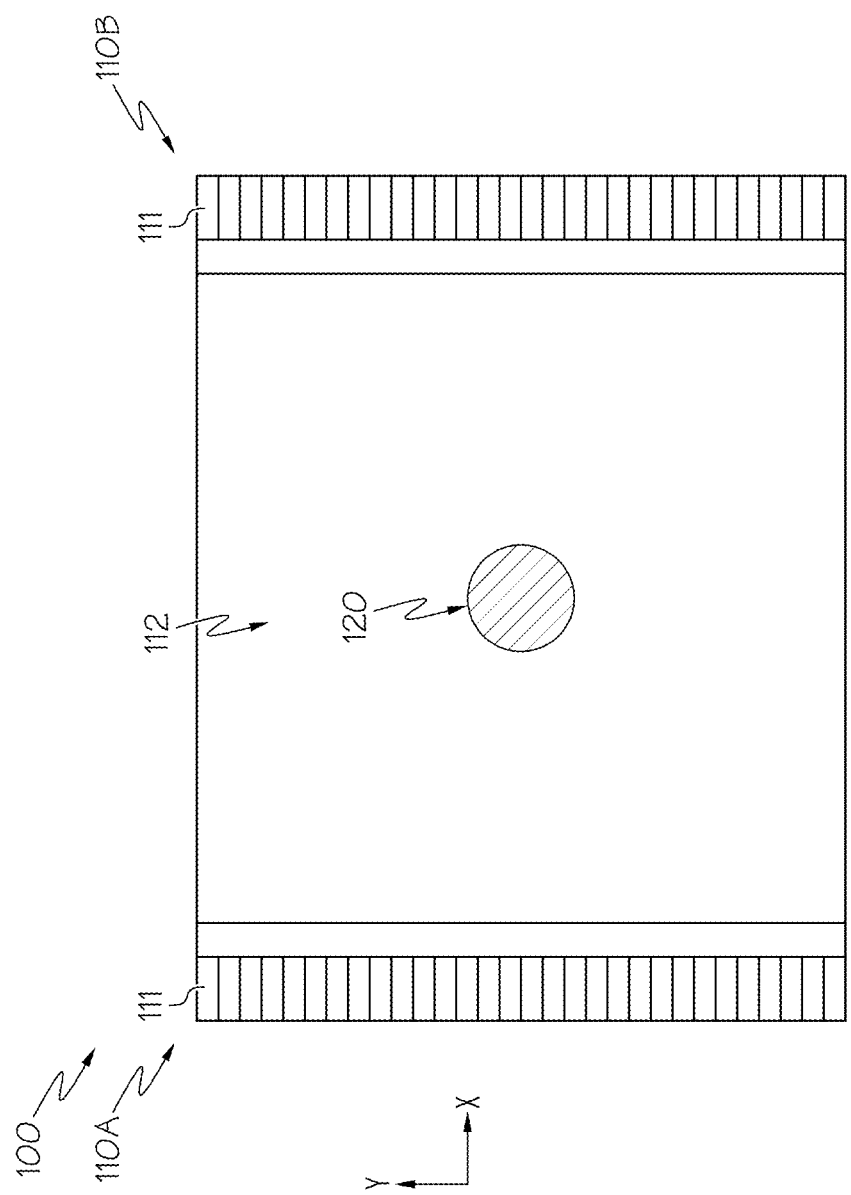
FIG. 1 schematically depicts an exemplary magnetic fluid cooling device according to one or more embodiments described and illustrated herein.

Referring now to FIG. 1, embodiments described herein may be utilized to calculate discrete angles of magnet elements 111 of a magnetic fluid cooling device 100. Although embodiments described herein are described in the context of arranging magnet elements 111 of a magnetic fluid cooling device 100, embodiments are not limited thereto. Embodiments may be used to determine the orientation of physical material properties of any device or system. As an example and not a limitation, embodiments described herein may be used to determine the direction of fibers in various layers of a composite material structure.

As described in more detail below, the magnetic fluid cooling device 100 is configured to generate a magnetic field that disrupts thermal boundary layers that may develop within coolant fluid located in a magnetic fluid chamber 112. Embodiments utilize a magnetic fluid in a thermo-magnetic cooling system to reduce the temperature field due to non-uniform heat flux caused by a heat generating device 120, such as a semiconductor device. More particularly, embodiments comprise a magnetic fluid chamber 112 in which a magnetic fluid flows, and magnetic field generating devices (i.e., magnet elements 111) capable of generating magnetic fields that disrupt the flow of the magnetic fluid and therefore preventing, disrupting and/or altering natural fluid and thermal boundary layers within the magnetic fluid. Disruption of the fluid and thermal boundary layers may increase the performance of the cooling structure. Exemplary magnetic fluid cooling devices 100 are further described in U.S. patent application Ser. No. 13/316,954 entitled "Magnetic Fluid Cooling Devices and Power Electronics Assemblies" filed on Dec. 12, 2011, which is hereby incorporated by reference in its entirety.

FIG. 1 schematically depicts a magnetic fluid cooling device 100 according to one embodiment. The magnetic fluid cooling device 100 may be coupled to a heat generating device 120 (e.g., a power semiconductor device, a motor, etc.) to remove heat flux q generated by the heat generating device. The magnetic fluid cooling device 100 generally comprises a magnetic fluid chamber 112 positioned between a first permanent magnet array 110A and a second permanent magnet array 110B. The first and second permanent magnet arrays 110A comprise magnet elements 111 configured as individual permanent magnets. As described in detail below, each magnet element 111 is arranged at a particular angle within the array to achieve a desired magnetic field pattern to optimally cool the heat generating device 120, which may be thermally coupled to a heat receiving surface of the magnetic fluid cooling device 100. It should be understood that alternative embodiments may include more or fewer permanent magnet arrays, as other configurations are also possible.

Magnetic fluid is provided in the magnetic fluid chamber 112. The magnetic fluid may comprise any liquid that is susceptible to magnetic fields, and is capable of disrupting thermal boundary layers that are formed within the magnetic fluid by the application of the magnetic fields generated by the magnet elements 111. The magnetic fluid may include, but is not limit to, magneto-rheological fluids, ferrofluids, and liquid metals. The mechanism through which the thermal and magnetic fields are coupled is known as the Curie effect, where the susceptibility, X, of the magnetic fluid increases as a function of its temperature, T.

Figure 2:
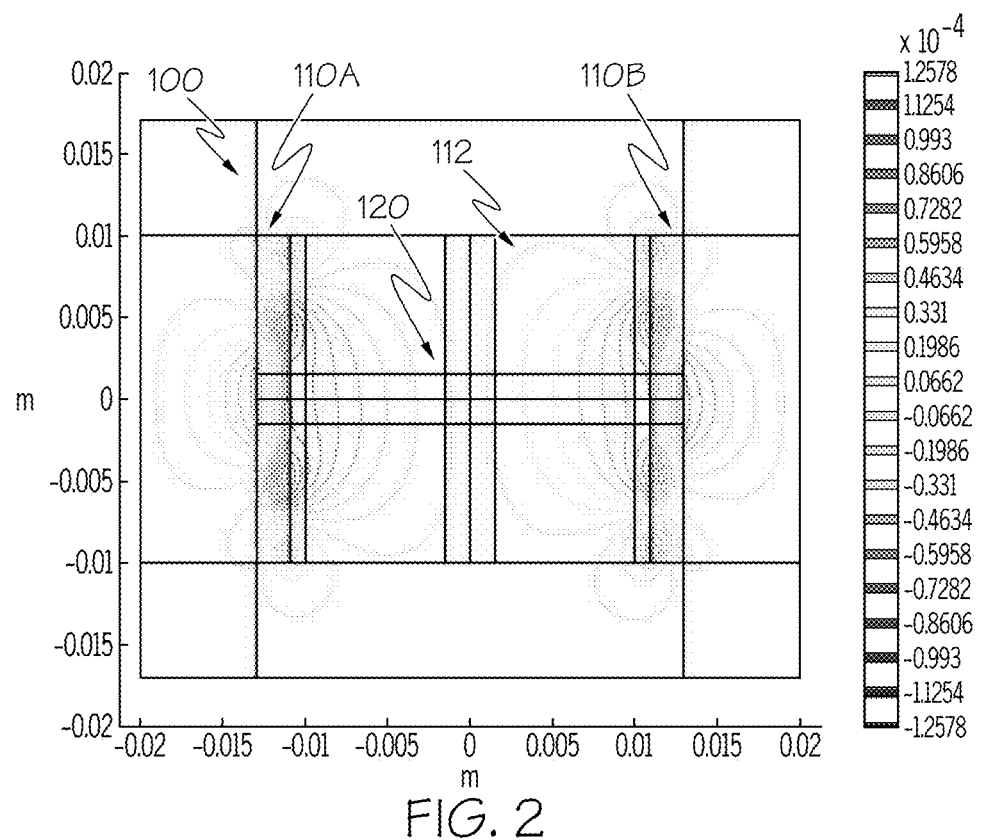
FIG. 2 graphically depicts simulated magnetic field patterns of the magnetic fluid cooling device depicted in FIG. 1 according to one or more embodiments described and illustrated herein.
Figure 3:
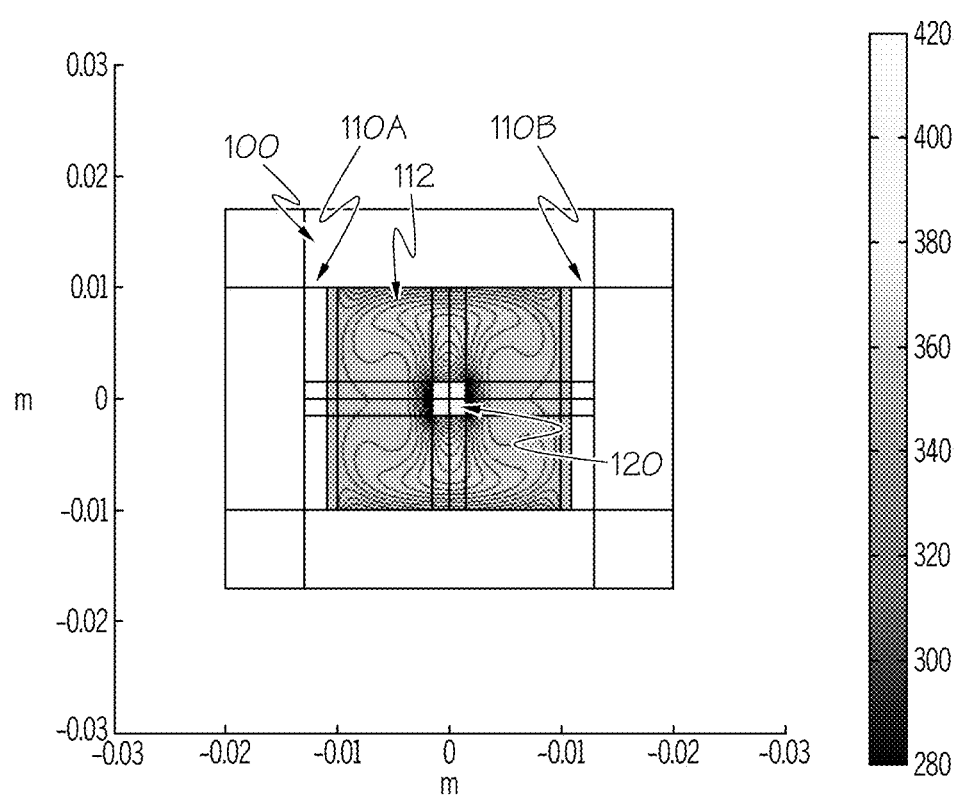
FIG. 3 graphically depicts a simulated temperature profile of the magnetic fluid cooling device depicted in FIG. 1 and the magnetic field patterns depicted in FIG. 2 according to one or more embodiments described and illustrated herein.
Figure 4:
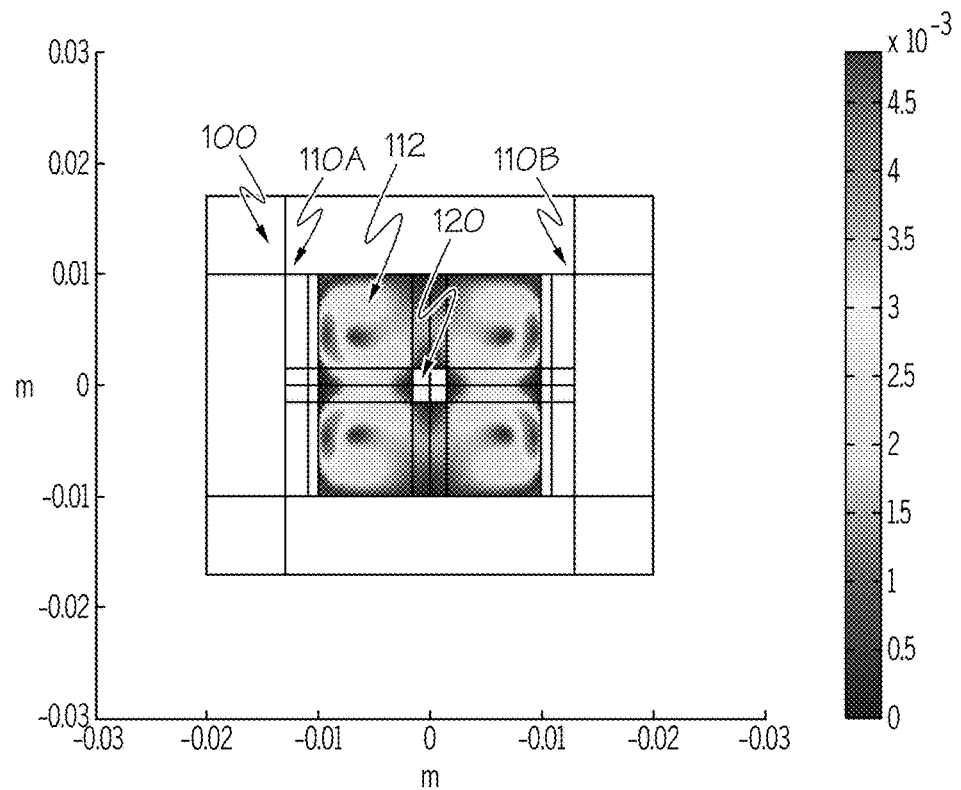
FIG. 4 graphically depicts simulated magnetic fluid velocity magnitude contours with the magnetic fluid cooling device depicted in FIG. 1 and the magnetic field patterns depicted in FIG. 2 according to one or more embodiments described and illustrated herein.

FIGS. 2-4 depict results of a simulation wherein a heat generating device 120 is cooled by magnetic fluid within a magnetic fluid chamber 112 as depicted in FIG. 1. FIG. 2 depicts magnetic field lines defining a magnetic field pattern (shown as magnetic vector potential with units of Wb/m) generated by the first and second permanent magnet arrays 110A, 110B of a simulated magnetic fluid cooling device 100, while FIG. 3 depicts the resulting temperature profile (° C.). FIG. 4 depicts the velocity magnitude contours of the magnetic fluid within the magnetic fluid chamber 112 resulting from the magnetic field patterns depicted in FIG. 2 (m/s$^2$), and the heat flux generated by the heat generating device 120. Colder magnetic fluid is drawn toward the heat generating device 120, while warmer magnetic fluid is pushed away from the heat generating device 120, thereby forming enhanced recirculation zones or flows within the magnetic fluid. These enhanced recirculation zones disrupt natural thermal boundary layers that typically form in liquid-cooled packages and improve the removal of heat flux from the heat generating device(s).

Figure 5:
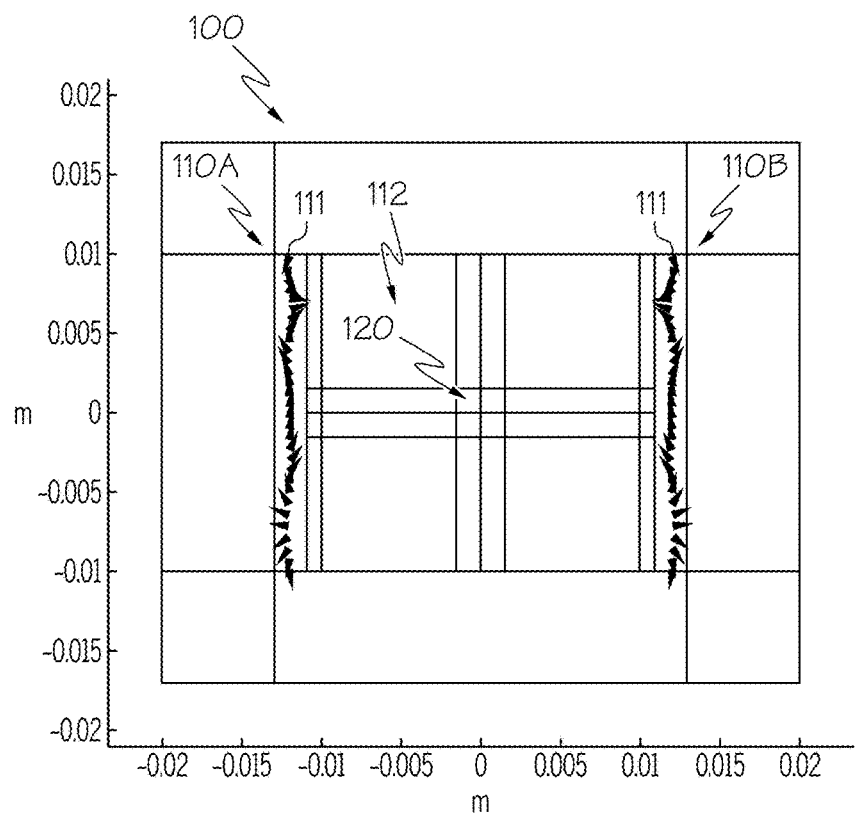
FIG. 5 schematically depicts an arrangement of magnet elements having continuous angles to produce the magnetic field patterns depicted in FIG. 2 according to one or more embodiments described and illustrated herein.

The magnetic field patterns depicted in FIG. 2 represent the optimal magnetic field patterns to provide the minimum surface temperatures of the temperature profile depicted in FIG. 3 as determined by simulation. To achieve the optimal magnetic field patterns depicted in FIG. 2, the individual magnet elements 111 of the first and second permanent magnet arrays 110A, 110B should be arranged such that the magnetic north of each magnet element 111 is pointed at a proper angle. FIG. 5 depicts an arrangement of the magnet elements 111 that yield the magnetic field patterns depicted in FIG. 2 as determined by simulation. The arrangement depicted in FIG. 5 is the result of gradient-based structural optimization. As shown in FIG. 5, the magnet elements 111 are arranged in continuous angles. However, such a magnetic fluid cooling device 100 with continuously angled magnet elements may be difficult to manufacture. It may be advantageous for manufacturing purposes to limit the number of possible angles for the permanent magnets to discrete, desirable angles (e.g., $\{0, \pi/2, \pi, 3\pi/2\}$ or $\{0, \pi/4, \pi/2, 3\pi/4, \pi, 5\pi/4, 3\pi/2, 7\pi/4\}$) (i.e., discrete angle design). However, it may be difficult to achieve convergence with polar based design values and penalty term approach.

Figure 6B:
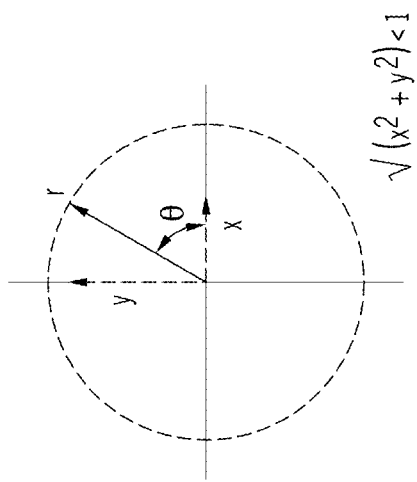
FIG. 6B graphically depicts coordinates in Cartesian form.
Figure 6A:
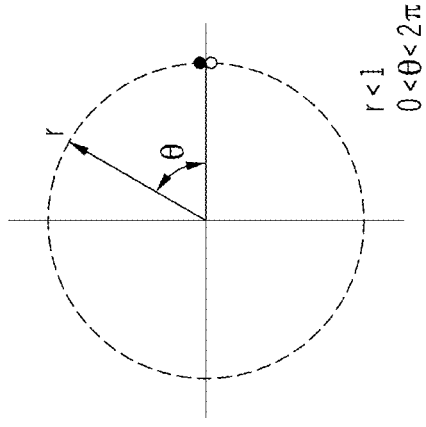
FIG. 6A graphically depicts coordinates in polar form.

In the above-described design problem, the ideal magnitude and direction of the permanent magnet should be determined in two dimensions. There are two potential options in the selection of design values as shown in FIGS. 6A and 6B. A first option, as shown in FIG. 6A, is to use magnitude and angle as design values (polar form). A second option, as shown in FIG. 6B, is to use vector component x and y as design values (Cartesian form).

Polar form presents issues about the bound of angle. If the angle is bounded by 0 to $2\pi$ radian, as shown in FIG. 6A, the range between 0 and $2\pi$ in a clockwise direction will be discontinuous even physically it is continuous. This may be an obstacle for gradient-based optimization because a variable on the bounds cannot move to a value across the bound. With Cartesian form, such discontinuity does not appear. Instead, a nonlinear design constraint must be introduced to keep the amplitude of the vector within given maximum value (e.g. unity, which is written as $\sqrt{(x2+y2)}<1$, i.e., quadratic constraint). Because this nonlinear constraint has to be enforced to each pair of design values independently, it is difficult to implement when the problem had a large number of design values.

Figure 7B:
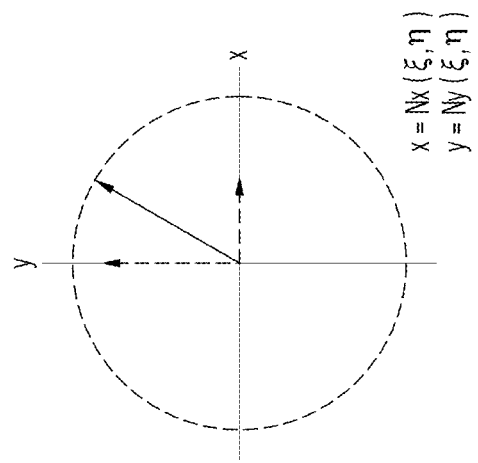
FIG. 7B graphically depicts an isoparametric shape function used to map $\xi$, $\eta$ to x, y according to one or more embodiments described and illustrated herein.
Figure 7A:
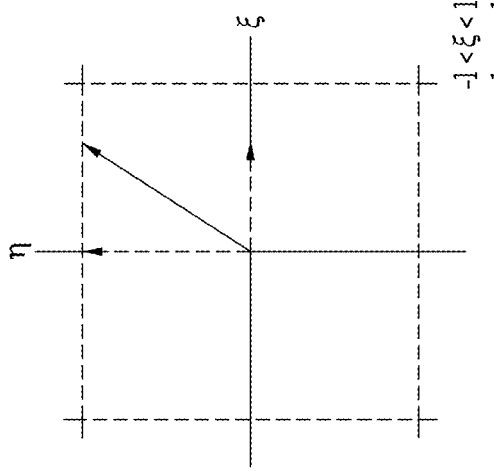
FIG. 7A graphically depicts a normalized coordinate system with side constraints according to one or more embodiments described and illustrated herein.

As described in more detail below, in embodiments of the present disclosure, the latter Cartesian formulation is converted into a simpler problem with only side constraints. The x and y design values in the original problem are derived from newly introduced design values $\xi$ and $\eta$ on a normalized coordinate system with side constraints. An isoparametric shape function is used to map from $\xi$ and $\eta$ to x and y (FIGS. 7A and 7B). The nonlinear constraint to x and y will automatically be satisfied by choosing appropriate shape function. FIGS. 7A and 7B show that normalized design values $\xi$ and $\eta$ are projected onto a circular isoparametric shape function $Nx(\xi, \eta)$, $Ny(\xi, \eta)$.

Embodiments also use isoparametric projection for promoting angular design values of material physical properties to converge into the set of desired angles. For example, the isoparametric projection shape function may be manipulated (via penalty factor) such that the magnetic elements 111 (or other components depending on the structure being designed) may be arranged at the desired angles ({0, 7 π/2, π, 3 π/2} or {0, π/4, π/2, 3 π/4, π, 5 π/4, 3 π/2, 7 π/4}).

Figure 8B:
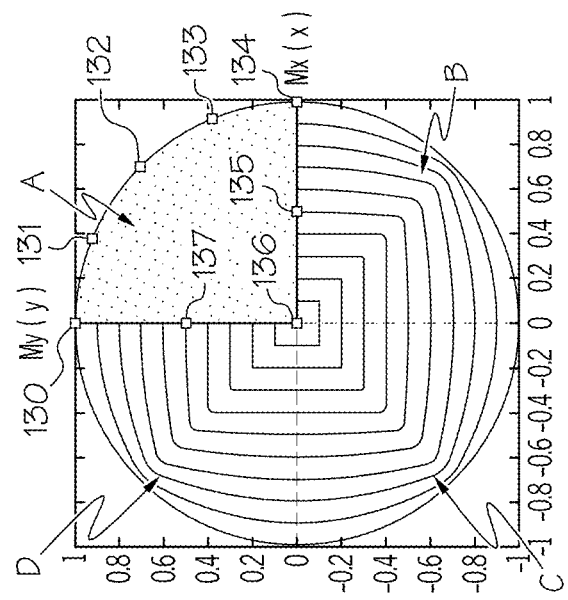
FIG. 8B graphically depicts a four quadratic eight node isoparametric shape function according to one or more embodiments described and illustrated herein.
Figure 8A:
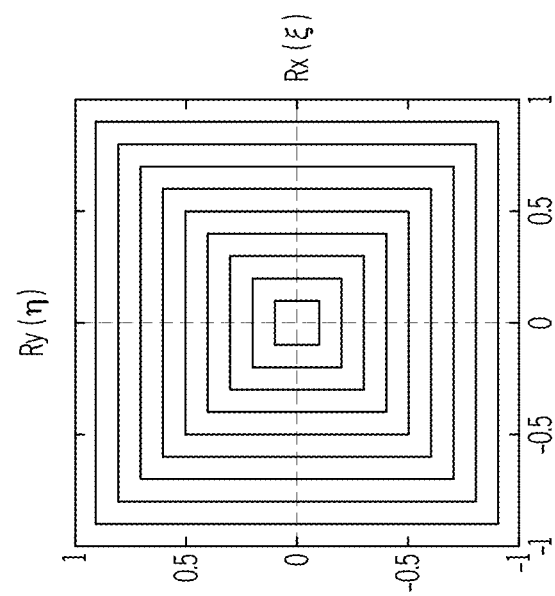
FIG. 8A graphically depicts squares drawn on a normalized $\xi$, $\eta$ coordinate system according to one or more embodiments described and illustrated herein.

Referring now to FIGS. 8A and 8B, squares drawn on a normalized coordinate system ξ, η (box constraint), and an isoparametric shape function to map the design values ξ, η to the magnetization space x, y (circular constraint) are respectively illustrated. The geometric transform from a box to a circle is performed by the isoparametric shape function.

The isoparametric shape function depicted in FIG. 8B uses four quadratic eight node elements (nodes 130-137) to cover four quadrants A-D. Nodes 130, 132 and 134 represent discrete, desired angles for the magnetic elements. The illustrated isoparametric shape function provides for eight desired angles {0, π/4, π/2, 3 π/4, π, 5 π/4, 3 π/2, 7 π/4}. Intermediate nodes 131 and 133 represent undesirable angles between desirable angles provided by nodes 130, 132, and 134. Accordingly, the nodes alternate between discrete, desirable angle nodes and intermediate nodes. In some embodiments, the number of nodes is at least two times the number of discrete, desirable angles.

Figure 9:
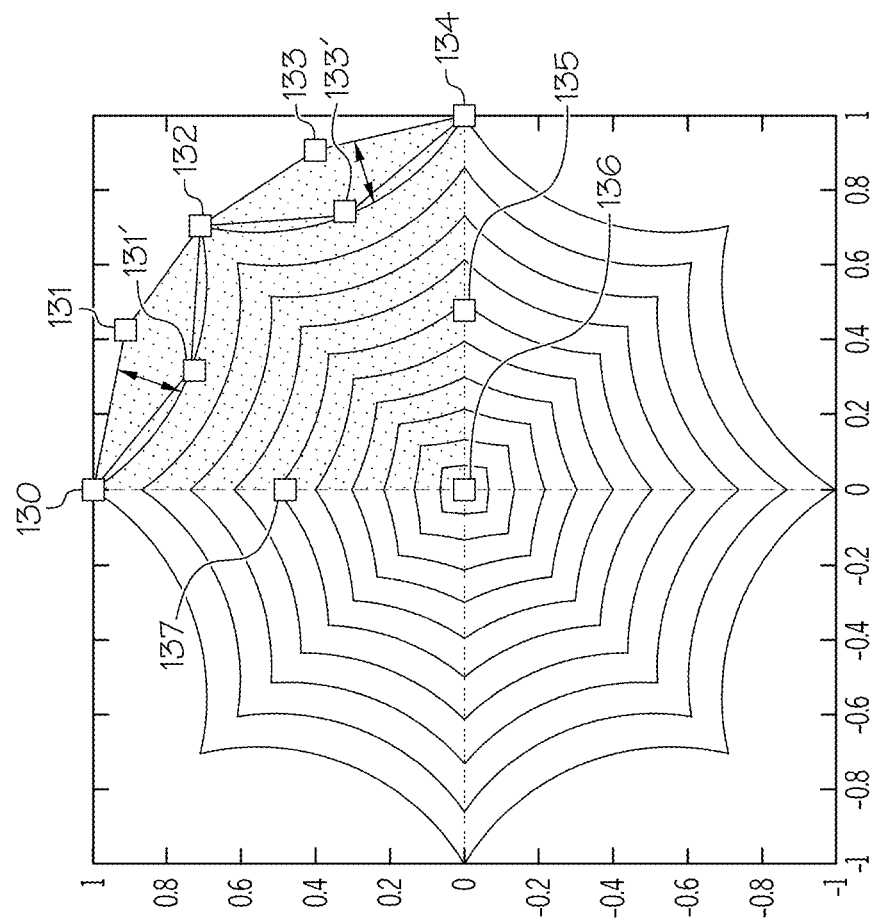
FIG. 9 graphically depicts the isoparametric shape function depicted in FIG. 8B with a penalty factor applied thereto according to one or more embodiments described and illustrated herein.
Figure 10B:
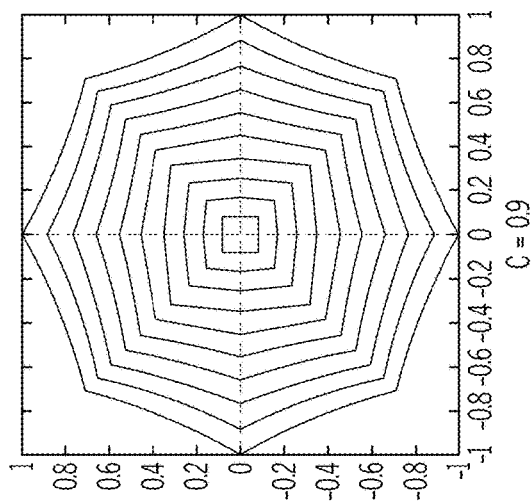
FIGS. 10A-10D depict isoparametric shape functions having various shapes according to embodiments described and illustrated herein.
Figure 10D:
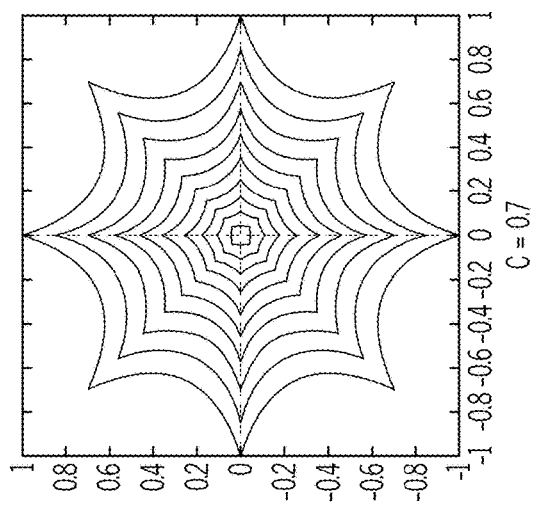
Figure 10A:
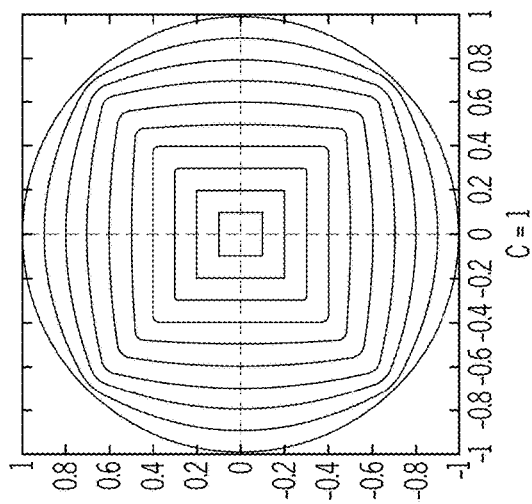
Figure 10C:
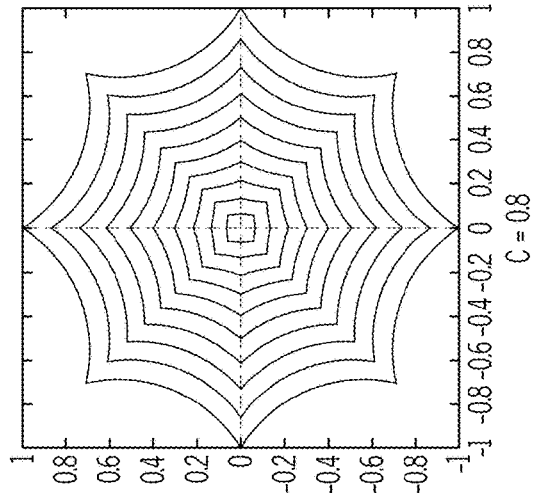

To encourage the magnet elements 111 to be positioned in at least one of the desired angles (i.e., ξ, η converged into −1, 1, or 0), direct penalization by geometry transform of the isoparametric shape function is provided. Referring now to FIG. 9, the circular isoparametric shape function depicted in FIG. 8B is transformed into a star-shaped isoparametric shape function by application of a penalty factor c. With the star-shaped function, the amplitude of the vector (x, y) will have a high value at the vertices of the star when (ξ, η) is mapped to (x, y). Therefore, if the objective function has a characteristic to show better value (e.g., smaller) with the design values with larger amplitude in general, the optimizer will try to utilize that part. As a result, the design values converge at the vertices of the star. Thus, the vector design values x, y will have an angle close to the vertices of the star. When the penalty factor c=1, there is no penalty applied. A smaller c value yields a stronger penalty. Application of a smaller c value moves intermediate nodes 131 and 133 closer to (0, 0), as depicted by shifted intermediate notes 131' and 133'. FIGS. 10A-10D depict isoparametric shape functions with c=1, c=0.9, c=0.8, and c=0.7, respectively. During topology optimization, which may be implemented by finite element methods, the magnet elements 111 will be encouraged to be oriented at one of the desired angles.

Figure 11:
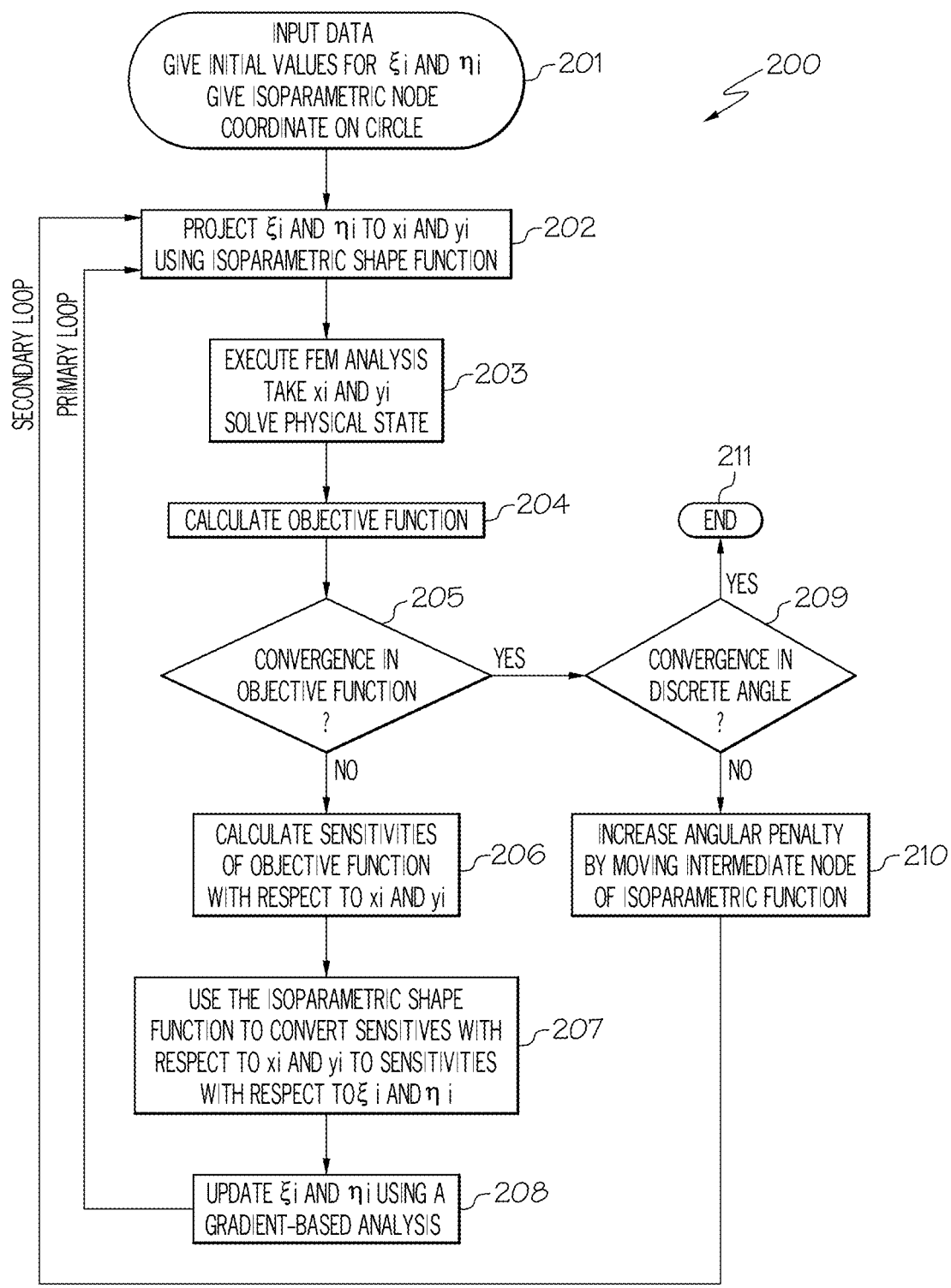
FIG. 11 is a flowchart depicting a process to obtain convergence in an objective function and convergence in discrete angle by constraint transformation using an isoparametric function and penalty factor according to one or more embodiments described and illustrated herein.

Referring now to FIG. 11, a flowchart describing an exemplary process for solving a structural optimization problem (e.g., arrangement of magnet elements 111 to provide for magnetic field patterns that yield a desirable temperature profile of a magnetic fluid cooling device 100) is depicted. Generally, initial design values ξ, η are mapped to x, y using an isoparametric shape function. A topology optimization is performed to solve for the physical state of the system under analysis. If convergence in the objective function (e.g., a difference in temperature between iterations of the topology optimization) is not achieved, a gradient-based analysis is used to update the design values ξ, η, which are again mapped to x, y using the isoparametric shape function. The topology optimization is again performed and the objective function calculated. The process is repeated until convergence is achieved in the objective function. After convergence in the objective function occurs, the process checks to see if there is convergence in discrete angle (i.e., if each and every material physical property (e.g., magnet element 111) is arranged in one of the desired angles). If not, the shape of the isoparametric shape function is manipulated using penalization and the topology optimization is repeated until there is convergence in both the objective function and in discrete angle.

Figure 12A:
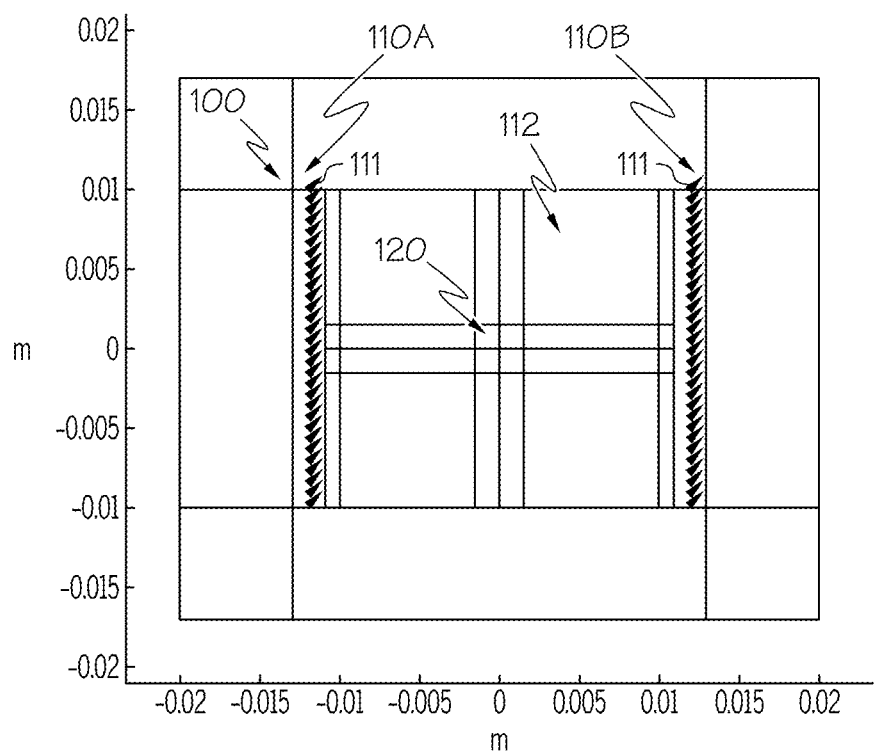
FIG. 12A schematically depicts a magnetic fluid cooling device with magnet elements arranged at an initial position prior according to one or more embodiments described and illustrated herein.

The flowchart of FIG. 11 will now be described in detail. At block 201, initial material physical property design values ξ$_i$ and η$_i$ representing the direction of magnet elements 111 on the normalized coordinate system are received, and the coordinates for the isoparametric nodes are defined on a circular isoparametric shape function. At block 202, the design values τ$_i$ and η$_i$ are projected to x$_i$ and y$_i$ using the isoparametric shape function in preparation of execution of a topology optimization in x, y space. Referring briefly to FIG. 12A, the magnet elements 111 of the first and second permanent magnet arrays 110A, 110B are arranged at an initial angle (e.g., π/4). The orientation (i.e., direction of magnetization) of the magnet elements 111 is defined by ξ$_i$ and η$_i$, where i=0 to the total number of magnet elements 111 (or other material physical properties in applications different from the exemplary magnetic fluid cooler application described herein).

At block 203, a topology optimization is executed using the projected design values to x$_i$, y$_i$ to solve for the physical state of the system. In the present application, the physical state of the magnetic fluid cooling device 100 may include, but is not limited to, the magnetic field patterns generated by the current arrangement of the magnet elements 111 depending on the present iteration of the topology optimization, the magnetic fluid flow within the magnetic fluid chamber 112 resulting from the magnetic field patterns and the heat flux generated by the heat generating device 120, and the temperature profile of the magnetic fluid cooling device 100 resulting from the magnetic fluid flow within the magnetic fluid chamber 112.

Figure 12B:
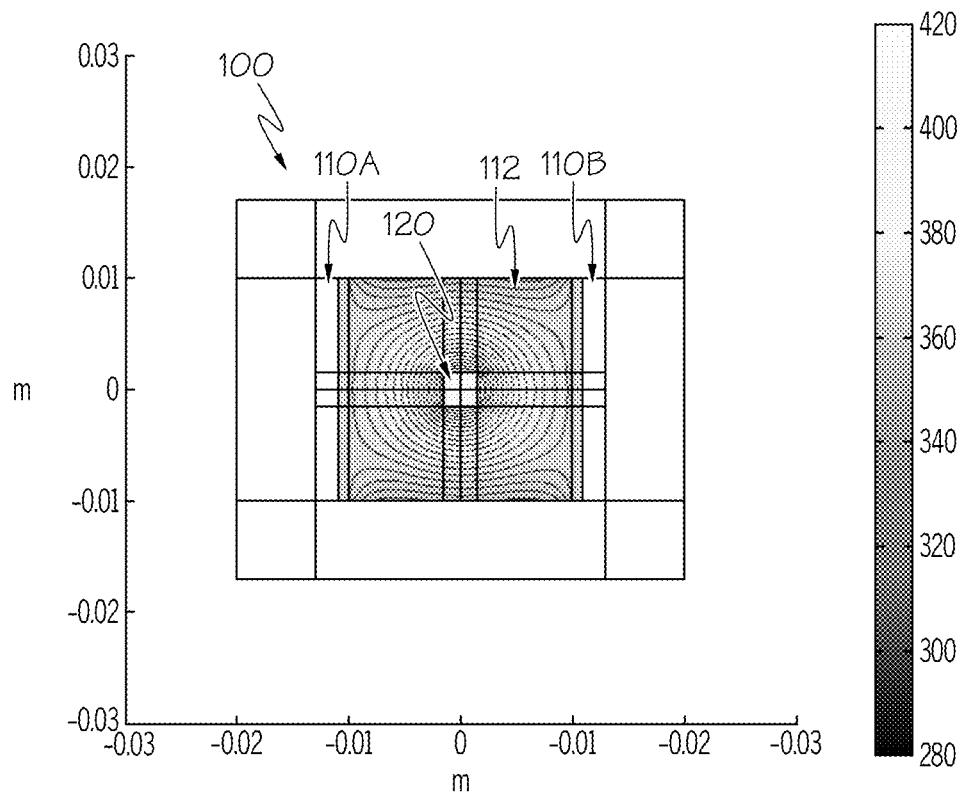
FIG. 12B graphically depicts a simulated temperature profile of the magnetic fluid cooling device with the magnet elements arranged as depicted in FIG. 12A according to one or more embodiments described and illustrated herein.
Figure 12C:
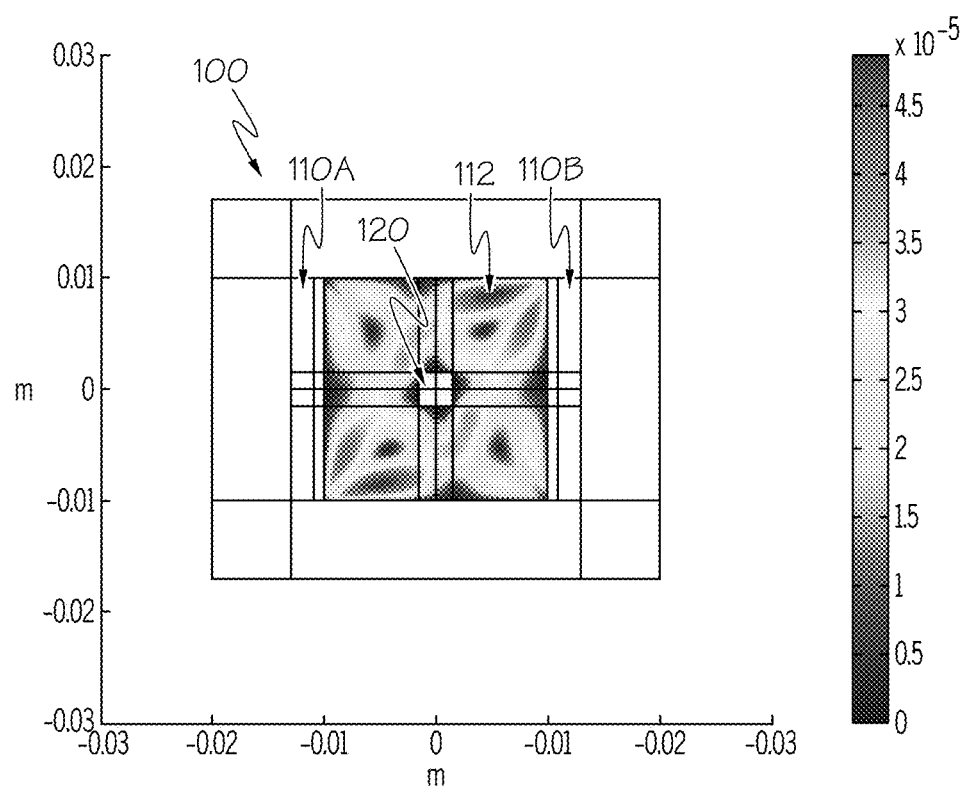
FIG. 12C graphically depicts simulated magnetic fluid velocity magnitude contours within the magnetic fluid cooling device with the magnet elements arranged as depicted in FIG. 12A according to one or more embodiments described and illustrated herein.
Figure 12D:
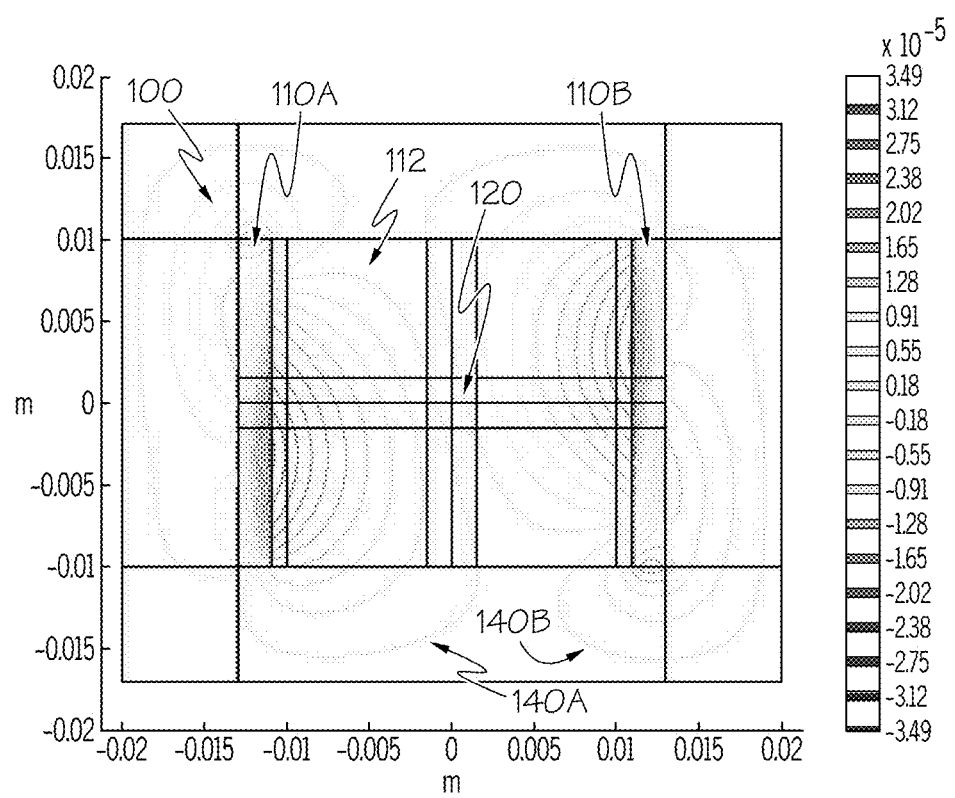
FIG. 12D graphically depicts simulated magnetic field patterns of the magnetic fluid cooling device depicted in FIG. 12A according to one or more embodiments described and illustrated herein.

FIGS. 12B-12D graphically depict, after one iteration of the topology optimization (i.e., the magnet elements 111 are arranged in the initial configuration depicted in FIG. 12A), a temperature profile (with temperature contour lines) of the magnetic fluid cooling device 100 (FIG. 12B) (° C.), magnetic fluid flow velocity magnitude contours within the magnetic fluid chamber 112 (FIG. 12C) (m/s$^2$), and magnetic field patterns 140A, 140B produced by the first and second permanent magnet arrays 110A, 110B (FIG. 12D) (wb/m).

Referring once again to FIG. 11, at block 204 the objective function is calculated based on the previous iteration of the topology optimization. In the magnetic fluid cooling device application, the objective function may be based on the temperature of the magnetic fluid cooling device 100. As an example and not a limitation, the objective function may be based on a difference in temperature between the present iteration of the topology optimization and the prior iteration. The objective function may be, without limitation, a different in the average temperature of the magnetic fluid cooling device or a difference in the maximum temperature of the magnetic fluid cooling device.

A determination of whether there is convergence in the objective function is made at decision block 205. Convergence in the objective function may be, for example, when the difference between the present calculation of the objective function and the prior calculation of the objective function is less than (or greater than, depending on the application) a threshold. As an example and not a limitation, convergence may be defined as being achieved when the calculation of the prior objective function and the present calculation of the objective function (e.g., the difference between the previous average temperature and the present average temperature) is within 0.5%. It should be understood that other metrics/thresholds may be used depending on the particular application.

If there is not convergence in the objective function, a determination as to how to update the design values is made at blocks 206 and 207 such that the topology optimization may be executed again using updated design variables. At block 206, sensitivities of the objective function with respect to x and y are calculated. The sensitivities of the objective function represent the slope of the previous objective function calculations. The sensitivities (i.e., slope) in $x_i$ and $y_i$ is converted back (i.e., reverse-translated) into $\xi_i$ and $\eta_i$ using the isoparametric shape function at block 207. This retranslates the sensitivities of the design variables back onto the normalized coordinate system.

At block 208, $\xi_i$ and $\eta_i$ are updated using a gradient-based analysis. A determination of how much to change $\xi_i$ and $\eta_i$ to achieve convergence in the objective function is made based on the slope calculated at blocks 206 and 207. A math programming method may be used to determine how to update $\xi_i$ and $\eta_i$ to achieve convergence in the objective function, such as the method of moving asymptotes ("MMA"). Accordingly, updated design variables $\xi_i$ and $\eta_i$ are created at block 208. The process moves back to block 202, where the updated design variables $\xi_i$ and $\eta_i$ are projected (i.e., translated) to $x_i$ and $y_i$ using the isoparametric shape function. Blocks 202-208 are repeated until convergence in the objective function is achieved at decision block 205.

An exemplary process depicted by blocks 202-208 will now be described mathematically. As stated above, vector design variables with Cartesian vector components are used. The following nonlinear programming problem, assumed to be solved by gradient based methods, is provided below:

Minimize: $f(p)$
Subject to:
$p=\{(x_1, y_1), (x_2, y_2), \ldots, (x_i, y_i), \ldots, (x_n, y_n)\}$, and
$\sqrt{(x_i^2+y_i^2)}<1$ for $i=1, 2, \ldots, n$.

where p, $x_i$, $y_i$ are respectively the design variable set, and x and y component of each design variable. Note that the nonlinear constraints $\sqrt{(x_i^2+y_i^2)}<1$ can be any other formula describing the bound which pair $x_i$, $y_i$ should reside within.

For partial differential equation ("PDE") constrained optimization problems, such as structural optimization problems, it can be written as follows:

Minimize: $f(u,p)$
Subject to:
$K(p)u=0$,
$p=\{p_i|(x_1, y_1), (x_2, y_2), \ldots, (x_i, y_i), \ldots, (x_n, y_n)\}$, and
$\sqrt{(x_i^2+y_i^2)}<1$ for $i=1, 2, \ldots, n$.

where $K(p)$ is design dependent physical system matrix derived from PDE, such as stiffness matrix obtained by the finite element method (i.e., topology optimization) and u is an unknown variable vector of the equation that usually holds physical states, such as temperature or displacement.

Rather than solving the above problem directly, the design variables $\xi$, $\eta$ are introduced on a normalized coordinate system such that $q=\{(\xi_1, \eta_1), (\xi_2, \eta_2), \ldots, (\xi_i, \eta_i), \ldots, (\xi_n, \eta_n)\}$; p is formulated with q using the following relationship:

$x_i=Nx(\xi_i, \eta_i)$, and
$y_i=Ny(\xi_i, \eta_i)$, where $Nx(\xi_i, \eta_i)$ and $Ny(\xi_i, \eta_i)$ are the shape functions of the isoparametric shape function used in the finite element method analysis. By choosing the appropriate isoparametric shape function $Nx(\xi_i, \eta_i)$ and $Ny(\xi_i, \eta_i)$, $\sqrt{(x_i^2+y_i^2)}<1$ for $i=1, 2, \ldots, n$ will be automatically satisfied with the following simple side constraints to $\xi$ and $\eta$:

$-1<\xi<1$, and
$-1<\eta<1$.

The entire optimization problem may be reformulated as follows:

Minimize: $f(u,q)$
Subject to:
$K(p)u=0$,
$p=N(q)$,
$q=\{(\xi_1, \eta_1), (\xi_2, \eta_2), \ldots, (\xi_i, \eta_i), \ldots, (\xi_n, \eta_n)\}$,
$-1<\xi<1$, and
$-1<\eta<1$.

The above problem may be solved by a nested approach, e.g., solving $K(p)u=0$ separately to obtain values of objective and constraint functions and their derivatives. Calculation cost of $p=N(q)$ is almost ignorable and derivatives such as df/dq may be calculated using the chain rule df/dq=df/dp*dp/dq. The calculation cost of dp/dq is also ignorable. Thus, the original problem is transformed into a simpler problem without n of nonlinear constraints with only ignorable cost.

As an example and not a limitation, an isoparametric shape function of eight node quadratic elements as described above may be used for the above problem with quadratic constraints. The quadratic constraints, $\sqrt{(x_i^2+y_i^2)}<1$ for $i=1, 2, \ldots, n$ will be automatically satisfied by putting eight nodes along a unit circle to make the element boundary circle. For example, $(\cos(n\ \pi/4), \sin(n\ \pi/4))$ for $n=0, 1, \ldots, 7$ may be an appropriate choice.

Referring once again to FIG. 11, if there is convergence in the objective function at decision block 205, the process checks to determine if there is convergence in discrete angle at decision block 209. Convergence in discrete angle is defined as all of the material physical properties (e.g., the magnet elements 111) arranged in the discrete, desired angles described above. Convergence in discrete angle occurs when $\xi$, $\eta=-1$, 0, or 1 (see FIG. 8A).

If convergence in discrete angle is not achieved, the isoparametric shape function is manipulated by applying a penalty factor c that moves the intermediate nodes 131, 133 (see FIG. 8B) to encourage the properties to be oriented in the desired angles. The penalty factor c changes the shape of the isoparametric shape function from circular as originally provided to a star shape. The shape of the modified isoparametric shape function depends on how many nodes are provided.

After modification of the isoparametric shape function, the process returns to block 202 where the current design variables $\xi$, $\eta$ are projected onto the modified isoparametric shape function. The topology optimization is again repeated until convergence in the objective function is achieved. If there is no convergence in the discrete angle once again at decision block 209, the isoparametric shape function is modified once again and the entire process repeated until there is convergence in both the objective function and discrete angle, where the process ends at 211. The result is an arrangement of the magnet elements 111 that provides for enhanced cooling performance while also easing assembly of the magnetic fluid cooling device 100.

Figure 12E:
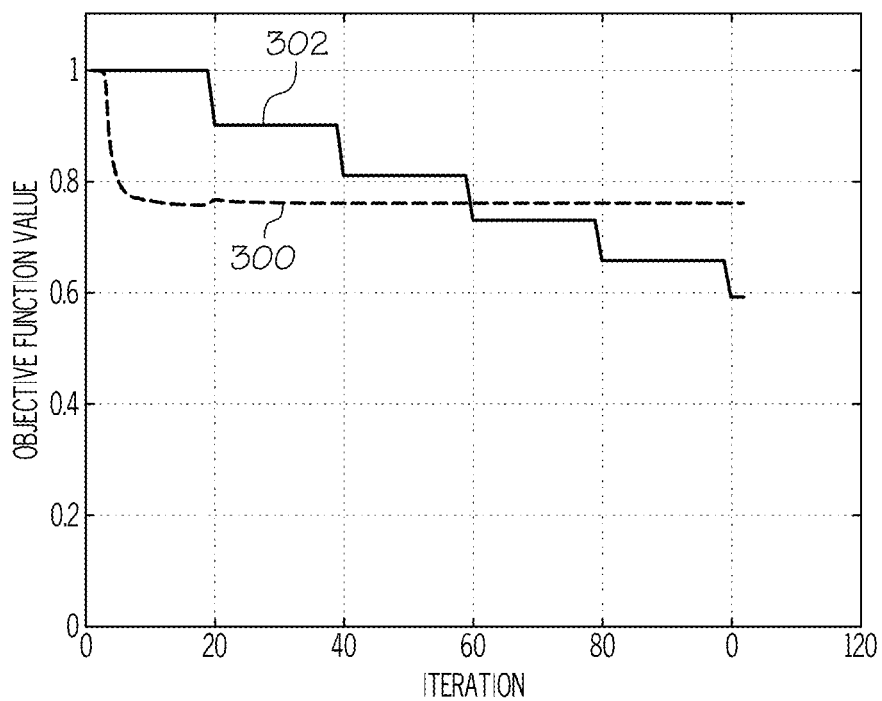
FIG. 12E graphically depicts an objective function value of the magnetic fluid cooling device depicted in FIG. 12A and a penalty factor according to one or more embodiments described and illustrated herein.

Referring once again to FIG. 5, a magnetic fluid cooling device 100 having first and second permanent magnet arrays 110A, 110B with magnet elements 111 arranged such that there is convergence in the objective function (e.g., maximum or average temperature) after 20 iterations of the topology optimization but not convergence in discrete angle. FIG. 12E plots the objective function value as curve 300 and the penalty factor as curve 302. Convergence in the objective function is achieved after 20 iterations in the present example. As shown in curve 304 of FIG. 12F, the minimum maximum temperature of the magnetic fluid cooling device 100 (the basis for the objective function) occurs after about 20 iterations of the topology optimization. Although the arrangement of the magnet elements 111 depicted in FIG. 5 may provide for the optimal solution, fabrication of such a magnetic fluid cooling device 100 may be difficult because many of the magnet elements 111 are not arranged in the desired angles.

Figure 12F:
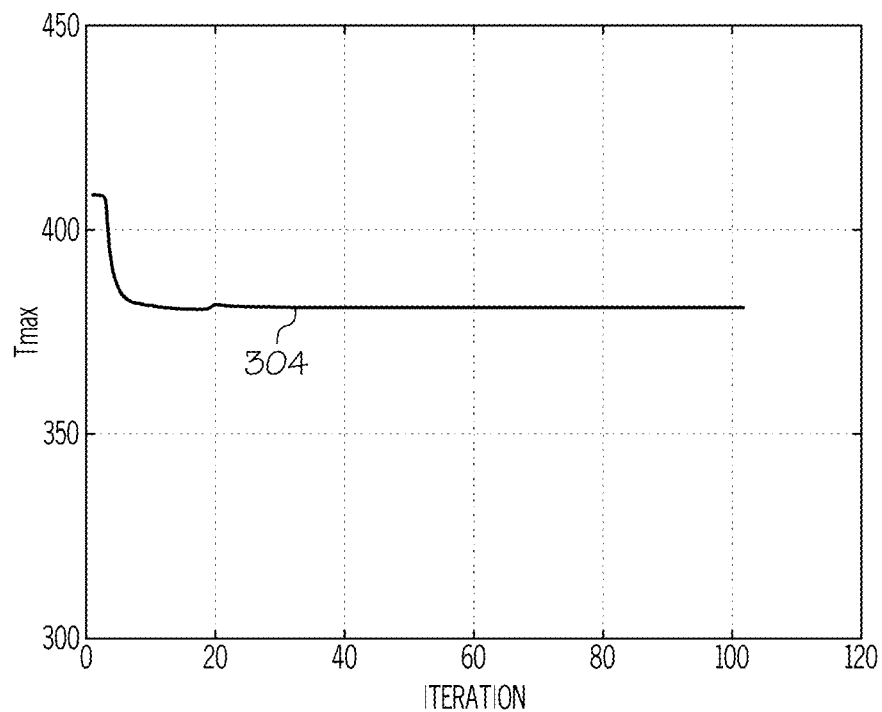
FIG. 12F graphically depicts a maximum temperature curve of the magnetic fluid cooling device depicted in FIG. 12A after several iterations of a topology optimization according to one or more embodiments described and illustrated herein.

Thus, a penalty factor is applied to the isoparametric shape function to encourage convergence in discrete angle. In the example illustrated in FIG. 12E, a penalty factor (c=0.9) is applied after 20 iterations. The penalty factor is depicted by curve 302. As shown in FIGS. 12E and 12F, there is a small performance drop with the application of the penalty factor. Embodiments of the present disclosure provide a balance between the optimal solution and ease of fabrication of the magnetic fluid cooling device 100.

Figure 13A:
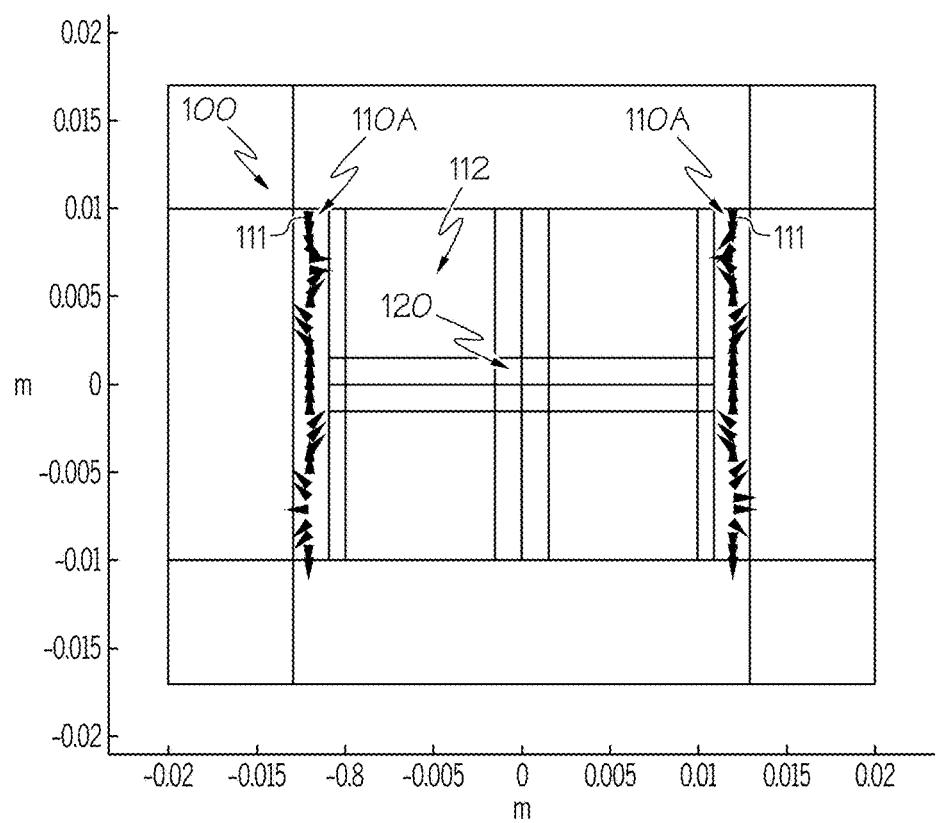
FIG. 13A schematically depicts a magnetic fluid cooling device with magnet elements arranged in discrete angles after convergence of an objective function and convergence in discrete angle according to one or more embodiments described and illustrated herein.
Figure 13B:
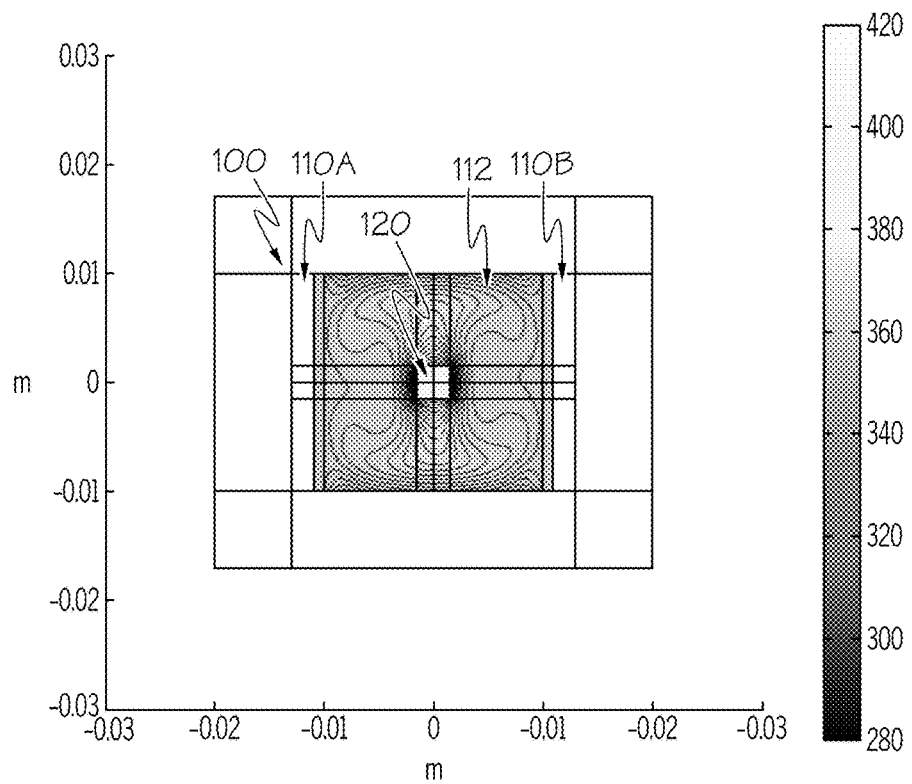
FIG. 13B graphically depicts a simulated temperature profile of the magnetic fluid cooling device with the magnet elements arranged as depicted in FIG. 12A according to one or more embodiments described and illustrated herein.
Figure 13C:
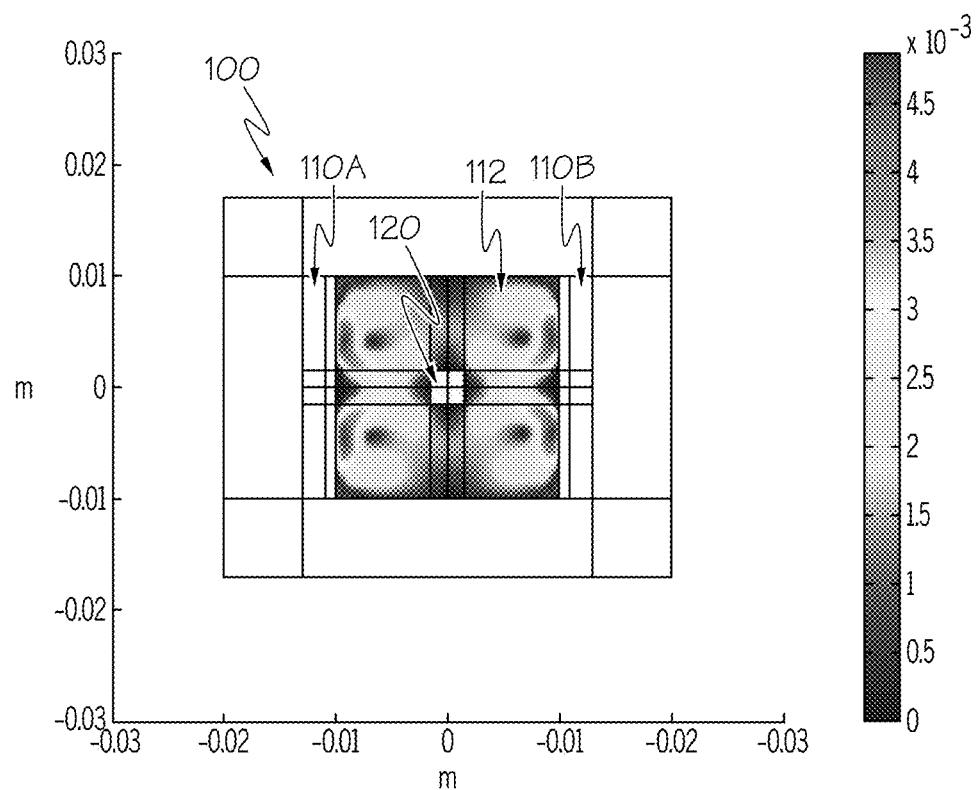
FIG. 13C graphically depicts simulated magnetic fluid velocity magnitude contours within the magnetic fluid cooling device with the magnet elements arranged as depicted in FIG. 13A according to one or more embodiments described and illustrated herein.
Figure 13D:
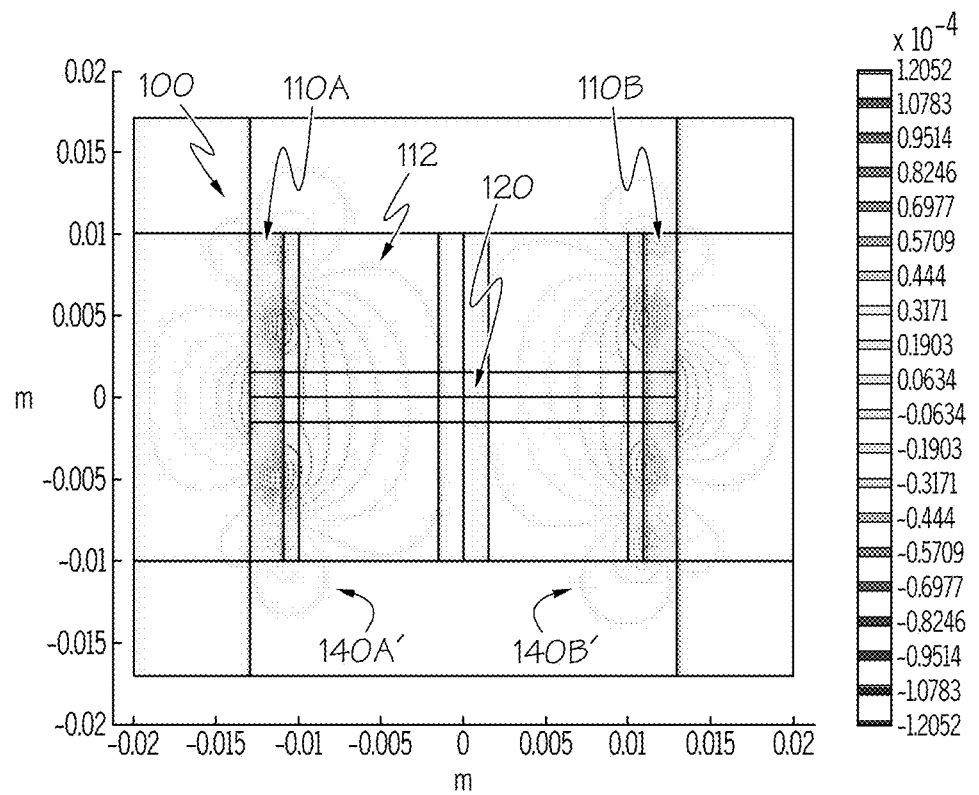
FIG. 13D graphically depicts simulated magnetic field patterns of the magnetic fluid cooling device depicted in FIG. 13A according to one or more embodiments described and illustrated herein.

FIG. 13A schematically depicts a magnetic fluid cooling device 100 after one hundred iterations and application of a penalty factor (c=0.9). As shown in FIG. 13A, convergence in discrete angle is achieved—each magnet element 111 is positioned in one of the discrete, desired angles. FIGS. 13B-13D depict the temperature profile in ° C. (with contour lines), the flow velocity magnitude contours of the magnetic fluid in m/s$^2$, and the magnetic field patters 140A', 140B' resulting from the magnet element arrangement depicted in FIG. 13A (weber), respectively. There is only a small performance drop of the arrangement depicted in FIG. 13A compared to the arrangement depicted in FIG. 5.

Figure 14A:
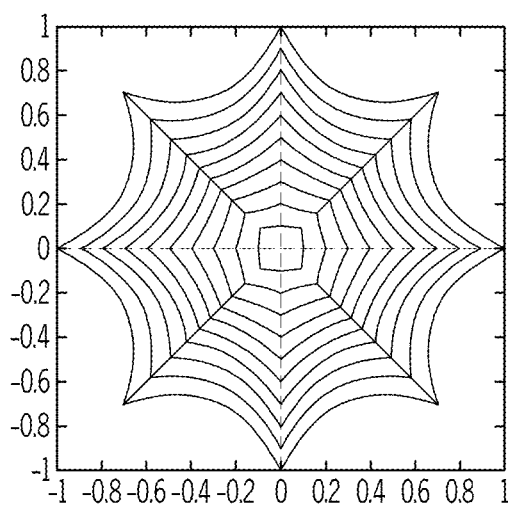
FIG. 14A graphically depicts an eight pointed star-shaped isoparametric shape function according to one or more embodiments described and illustrated herein.
Figure 14B:
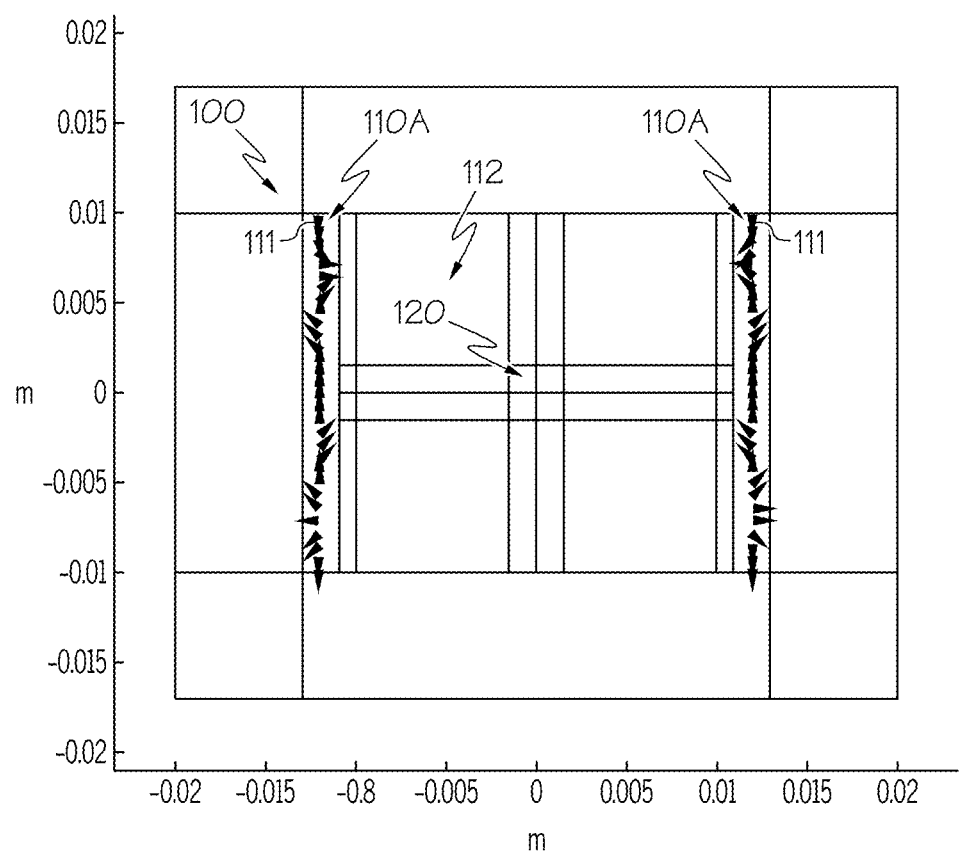
FIG. 14B schematically depicts a magnetic fluid cooling device with magnet elements arranged in accordance with the eight pointed star-shaped isoparametric shape function depicted in FIG. 14A.
Figure 15A:
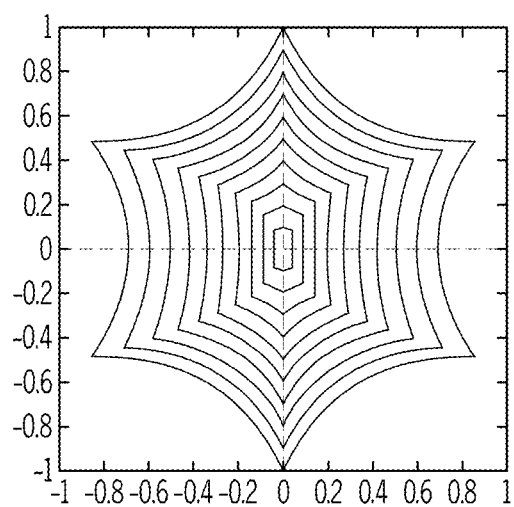
FIG. 15A graphically depicts a six pointed star-shaped isoparametric shape function according to one or more embodiments described and illustrated herein.
Figure 15B:
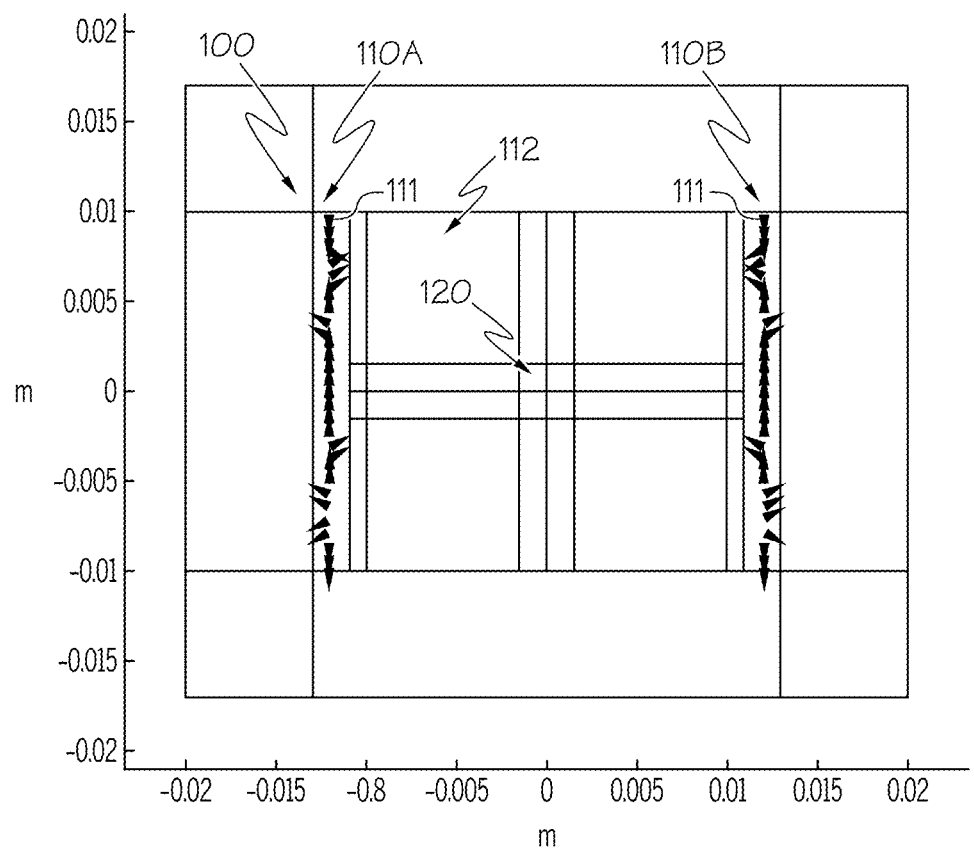
FIG. 15B schematically depicts a magnetic fluid cooling device with magnet elements arranged in accordance with the six pointed star-shaped isoparametric shape function depicted in FIG. 15A.
Figure 16A:
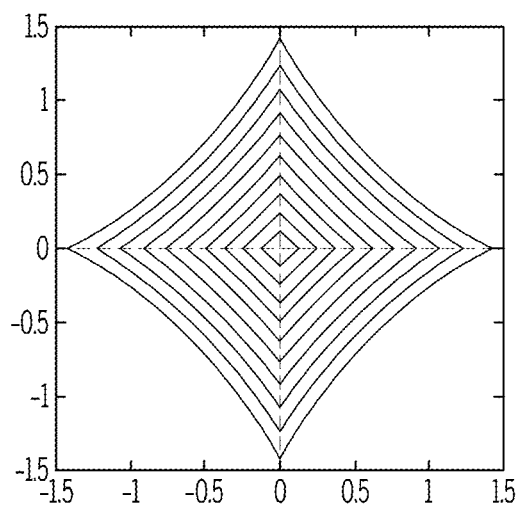
FIG. 16A graphically depicts a four pointed star-shaped isoparametric shape function according to one or more embodiments described and illustrated herein.
Figure 16B:
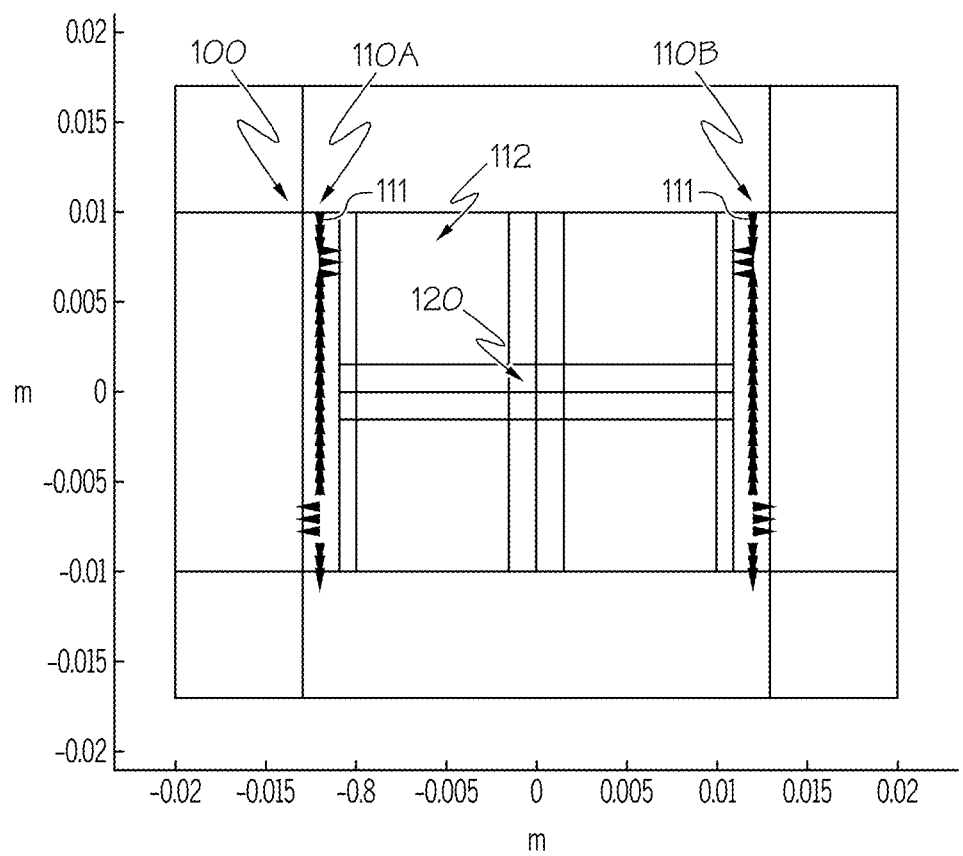
FIG. 16B schematically depicts a magnetic fluid cooling device with magnet elements arranged in accordance with the four pointed star-shaped isoparametric shape function depicted in FIG. 16A.
Figure 17A:
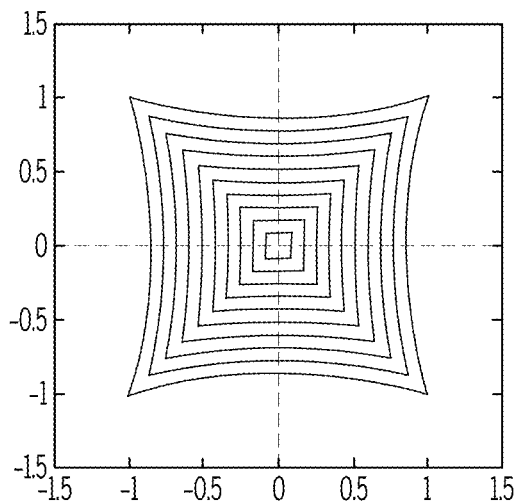
FIG. 17A graphically depicts a $\pi/4$ rotated four pointed star isoparametric shape function according to one or more embodiments described and illustrated herein.
Figure 17B:
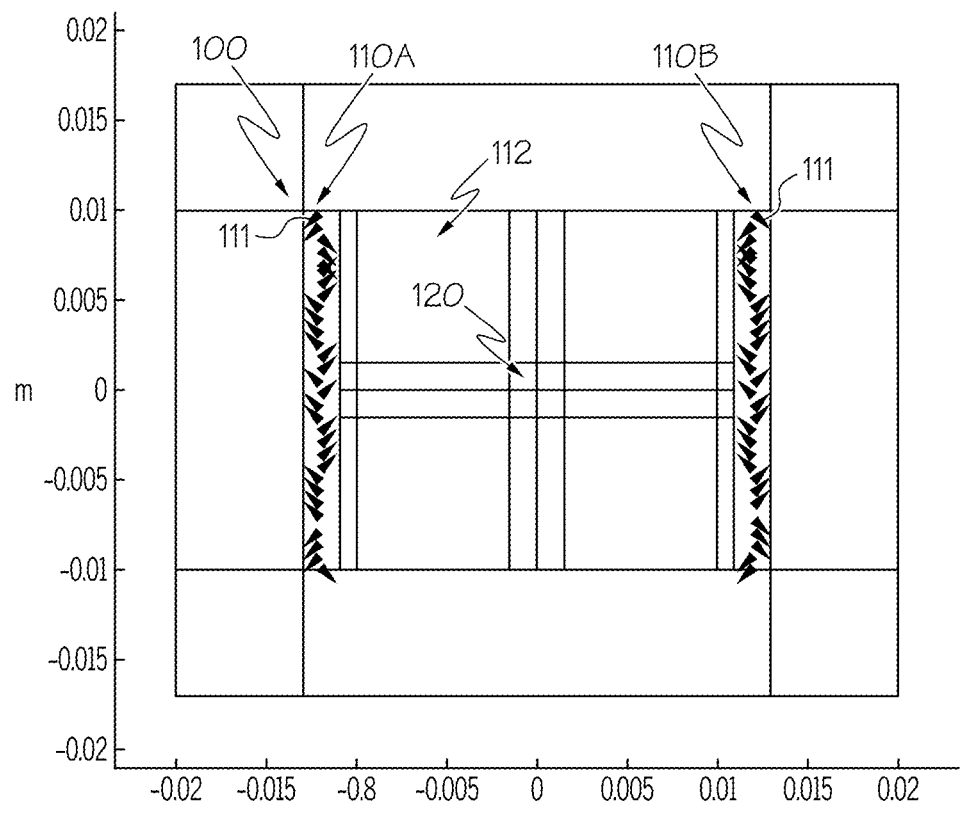
FIG. 17B schematically depicts a magnetic fluid cooling device with magnet elements arranged in accordance with the $\pi/4$ rotated four pointed star isoparametric shape function depicted in FIG. 17A.

Accordingly, embodiments of the present disclosure enable the determination of an arrangement of material physical properties (e.g., magnetic fields of magnet elements, carbon fibers, etc.) for high performance while also considering manufacturing considerations (e.g., discrete angle design). FIGS. 14A-17B provide examples of variously shaped isoparametric shape functions and the arrangement of magnet elements that they may yield. FIG. 14A depicts an eight pointed star-shaped isoparametric shape function as described above, and FIG. 14B depicts the resulting arrangement of magnet elements 111. FIG. 15A depicts a six pointed star shaped isoparametric shape function, and FIG. 15B depicts the arrangement of magnet elements 111 resulting from the isoparametric shape function depicted in FIG. 15A. FIGS. 16A and 16B depict a four pointed star shaped isoparametric shape function and the resulting magnet element 111 arrangement, respectively. FIGS. 17A and 17B depicts a π/4 rotated four pointed star isoparametric shape function and the resulting magnet element 111 arrangement respectively.

It should now be understood that embodiments described herein provide for conversion of nonlinear bound of vector design variables into side bounds using an isoparametric shape function. Embodiments also give a penalty to design variables arranged at undesirable angles by using a star-shaped isoparametric shape function. Embodiments may be utilized to determine an arrangement of material physical properties within a design. In one example, the methods described herein may be utilized to determine discrete angles of permanent magnets arranged in one or more arrays within a magnetic fluid cooling device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of determining an angle of fibers within layers of a composite structure:
   defining nonlinear and/or discontinuous design constraints of design values in a geometric domain associated with the fibers, the design values corresponding to the angle of the fibers;
   translating the nonlinear and/or discontinuous design constraints into continuous, first order design constraints of the design values by applying an isoparametric shape function;
   performing a topology optimization using the continuous, first order design constraints of the design values to orient the fibers at one of a plurality of discrete desired angles; and
   reverse-translating results of the topology optimization back into the geometric domain using the isoparametric shape function.

2. The method of claim 1, wherein the nonlinear and/or discontinuous design constraints are represented by Cartesian coordinates providing quadratic constraints $\sqrt{(x_i^2+y_i^2)}<1$ for i=1, 2, . . . n.

3. The method of claim 1, wherein:
   the isoparametric shape function is defined by a plurality of nodes arranged about a unit circle; and
   each node of the plurality of nodes corresponds to a possible angle of the fibers.

4. The method of claim 3, wherein a number of nodes of the plurality of nodes is at least two times greater than a number of discrete desired orientations of the fibers.

5. The method of claim 3, wherein the plurality of nodes comprises eight nodes defined by: $(\cos(n\pi/4), \sin(n\pi/4))$, for n=0, 1, . . . , 7.

6. The method of claim 1, further comprising applying a penalty factor to alter a shape of the isoparametric shape function to influence the angle of the fibers.

7. The method of claim 6, wherein application of the penalty factor alters the shape of the isoparametric shape function such that the isoparametric shape function is star-shaped.

8. A method of determining an angle of fibers within layers of a composite structure, the method comprising:
   providing initial design values $\xi_i$ and $\eta_i$ for fibers on a normalized coordinate system, wherein $-1<\xi_i<1$ and $-1<\eta_i<1$ for i=1, 2, . . . , n, and the initial design values $\xi_i$ and $\eta_i$ correspond to angles of the fibers;
   projecting the initial design values $\xi_i$ and $\eta_i$ to projected initial design values $x_i$ and $y_i$ on a Cartesian coordinate system using an isoparametric shape function $Nx(\xi, \eta)$, $Ny(\xi, \eta)$ having a plurality of nodes such that $x_i=Nx(\xi_i, \eta_i)$, $y_i=Ny(\xi_i, \eta_i)$ and $\sqrt{(x_i^2+y_i^2)}<1$, wherein each node of the plurality of nodes corresponds to a possible angle of the fibers; and
   obtaining convergence in an objective function by execution of a topology optimization of the projected initial design values $x_i$ and $y_i$ to orient each fiber at one of a plurality of discrete desired angles.

9. The method of claim 8, wherein obtaining convergence in the objective function further comprises:
   executing the topology optimization for the projected initial design values $x_i$ and $y_i$;
   determining a physical state of the device based on the topology optimization for the projected initial design values $x_i$ and $y_i$;

calculating the objective function based on the physical state of the device;

if there is not convergence in the objective function then:

calculating sensitivities of the objective function with respect to projected initial design values $x_i$ and $y_i$;

converting the sensitivities of the objective function with respect to the projected initial design values $x_i$ and $y_i$ onto the normalized coordinate system;

updating the initial design values $\xi_i$ and $\eta_i$ using the sensitivities with respect to the normalized coordinate system and a gradient-based analysis; and projecting updated design values $\xi_i'$ and $\eta_i'$ to projected updated design values $x_i'$ and $y_i'$ on the Cartesian coordinate system using the isoparametric shape function $Nx(\xi, \eta)$, $Ny(\xi, \eta)$ and repeating the topology optimization for the projected updated design values $x_i'$ and $y_i'$.

10. The method of claim 8, wherein the isoparametric shape function is circular.

11. The method of claim 8, wherein the isoparametric shape function is star-shaped.

12. The method of claim 8, wherein a number of nodes of the plurality of nodes is at least two times greater than a number of preferred discrete angles for the fibers.

13. The method of claim 8, wherein:

the plurality of nodes of the isoparametric shape function comprises alternating discrete desired angle nodes and intermediate nodes;

the discrete desired angle nodes correspond to the plurality of discrete desired angles; and the intermediate nodes correspond to a plurality of undesirable angles other than the plurality of discrete desired angles.

14. The method of claim 13, further comprising, after obtaining convergence in the objective function, determining if each fiber is oriented in one of the plurality of discrete desired angles.

15. The method of claim 14, further comprising, if at least one fiber is not oriented in one of the plurality of discrete desired angles, applying a penalty factor to the isoparametric shape function to obtain a modified isoparametric shape function, wherein the penalty factor shifts coordinates of the intermediate nodes.

16. The method of claim 15, wherein the penalty factor encourages individual fibers to be oriented in one of the plurality of discrete desired angles upon subsequent topology optimizations.

17. The method of claim 15, further comprising:

projecting updated design values $\xi_i'$ and $\eta_i'$ to projected updated design values $x_i'$ and $y_i'$ on the Cartesian coordinate system using the modified isoparametric shape function; and obtaining convergence in the objective function by execution of the topology optimization of the projected initial design values $x_i'$ and $y_i'$ to determine additional updated design values $x_i'$ and $y_i'$ for each fiber i of fibers.

* * * * *